(12) United States Patent
Iwai et al.

(10) Patent No.: US 6,729,542 B2
(45) Date of Patent: May 4, 2004

(54) METHOD AND APPARATUS FOR RECORDING DIGITAL INFORMATION IN TWO-DIMENSIONAL PATTERN, CARRIER OF DIGITAL INFORMATION RECORDED THEREBY, AND A METHOD AND APPARATUS FOR DECODING SUCH DIGITAL INFORMATION

(75) Inventors: Toshiyuki Iwai, Yamatokooriyama (JP); Atsushi Aoki, Kashiba (JP); Masahiro Esashi, Nara (JP); Hiroaki Niwamoto, Nara (JP); Norimasa Yamaguchi, Ikoma-gun (JP); Tsukasa Kaminokado, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 91 days.

(21) Appl. No.: 09/927,867

(22) Filed: Aug. 10, 2001

(65) Prior Publication Data
US 2002/0027165 A1 Mar. 7, 2002

Related U.S. Application Data

(62) Division of application No. 08/578,502, filed on Dec. 26, 1995.

(30) Foreign Application Priority Data

Dec. 27, 1994 (JP) .............................................. 6-325275

(51) Int. Cl.⁷ .................................................. G06K 7/10
(52) U.S. Cl. .................................. 235/462.08; 235/487
(58) Field of Search ................................. 235/456, 487, 235/494, 462.08, 462.09

(56) References Cited

U.S. PATENT DOCUMENTS

| | | | |
|---|---|---|---|
| 3,074,634 A | 1/1963 | Gamo | |
| 3,603,728 A | 9/1971 | Acimura | 382/151 |
| 4,776,464 A | 10/1988 | Miller et al. | 235/462 |
| 4,924,078 A | 5/1990 | Sant Anselmo et al. | 235/494 |
| 4,939,354 A | 7/1990 | Priddy et al. | 256/456 |
| 4,942,571 A | 7/1990 | Muller et al. | 307/10.1 |
| 5,153,418 A | 10/1992 | Batterman et al. | 235/494 |
| 5,202,552 A | 4/1993 | Little et al. | 235/494 |
| 5,288,986 A | 2/1994 | Pine et al. | 235/494 |
| 5,308,960 A | 5/1994 | Smith et al. | 235/462 |

(List continued on next page.)

FOREIGN PATENT DOCUMENTS

| | | |
|---|---|---|
| JP | 2-012579 | 1/1990 |
| JP | 06-231466 | 8/1994 |
| JP | 7-254037 | 10/1995 |
| JP | 10-503304 | 3/1998 |

OTHER PUBLICATIONS

Patent Abstracts of Japan, abstracting JP 7–254037–A of Oct. 3, 1995, Hara, et al.

(List continued on next page.)

*Primary Examiner*—Mark Tremblay
(74) *Attorney, Agent, or Firm*—David G. Conlin; David A. Tucker; Edwards & Angell, LLP

(57) ABSTRACT

A digital information recording carrier has a planar recording surface having an information recording area in which cells corresponding to bits are virtually set in a matrix form, each cell being provided with an optically recognizable mark corresponding to digital information so that the digital information is recorded in the information recording area as a two-dimensional pattern. The carrier also has specific patterns each consisting of a plurality of cells which are linked together and which are given marks in a given pattern. Some of the specific patterns are placed in an inner portion apart from a perimeter of the information recording area.

4 Claims, 29 Drawing Sheets

U.S. PATENT DOCUMENTS

| | | | |
|---|---|---|---|
| 5,343,031 A | 8/1994 | Yoshida | 235/494 |
| 5,353,023 A | 10/1994 | Mitsugi | 340/436 |
| 5,408,543 A | 4/1995 | Yoshida | 235/494 |
| 5,515,447 A | 5/1996 | Zheng et al. | 382/100 |
| 5,541,396 A | 7/1996 | Rentsch | 235/454 |
| 5,646,454 A | 7/1997 | Mattes et al. | 307/10.1 |
| 5,680,313 A | 10/1997 | Whittaker et al. | 340/436 |
| 5,726,435 A | 3/1998 | Hara et al. | 235/294 |
| 5,825,015 A | 10/1998 | Chan | 235/494 |
| 5,896,403 A | 4/1999 | Nagasaki et al. | 371/37.1 |
| 6,052,813 A | 4/2000 | Nagasaki et al. | 714/752 |
| 6,058,498 A | 5/2000 | Nagasaki et al. | 714/752 |

OTHER PUBLICATIONS

Benjamin Nelson, *Punched Cards to Bar Codes,* 1997 Helmers Publishing, pp. 236, 247, 296, and 339.

Roger C. Palmer *The Bar Code Book,* 1995, Helmers Publishing, pp. 331–334.

*QR CODE* (*Quick Response Code*), Systemkiki, Nippondenso, 1994.

Fig.6
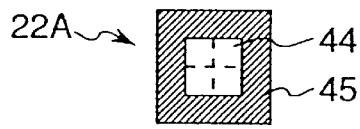
Fig.7
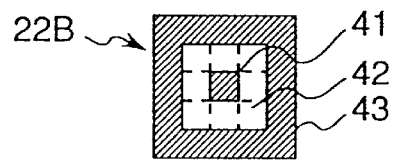
Fig.8A  Fig.8B  Fig.8C  Fig.8D
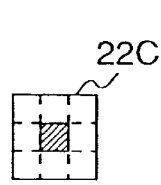 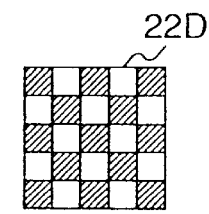 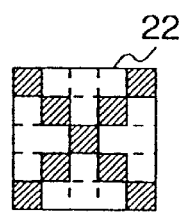 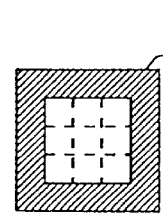
Fig.8E  Fig.8F  Fig.8G
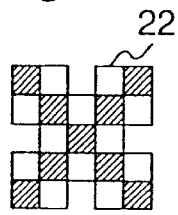 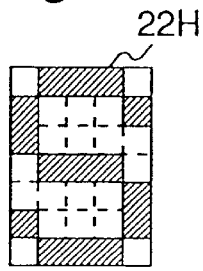 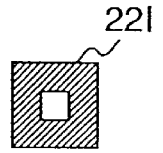

METHOD AND APPARATUS FOR RECORDING DIGITAL INFORMATION IN TWO-DIMENSIONAL PATTERN, CARRIER OF DIGITAL INFORMATION RECORDED THEREBY, AND A METHOD AND APPARATUS FOR DECODING SUCH DIGITAL INFORMATION

This is a divisional application of co-pending U.S. patent application Ser. No. 08/578,502, entitled METHOD AND APPARATUS FOR RECORDING DIGITAL INFORMATION IN TWO-DIMENSIONAL PATTERN CARRIER OF DIGITAL INFORMATION RECORDED THEREBY, AND A METHOD AND APPARATUS FOR DECODING SUCH DIGITAL INFORMATION, and filed Dec. 26, 1995 by T. Iwai et al. (the same inventors as of this divisional application), now allowed.

BACKGROUND OF THE INVENTION

1. Field of the Invention

The present invention relates to a digital information recording carrier having digital information recorded in the form of a two-dimensional pattern on a recording surface of the carrier. The invention also relates to a digital information recording method and apparatus which can produce such digital information carriers. Further, the invention relates to a digital information decoding method and apparatus which can read and decode digital information recorded on such a digital information carrier.

2. Description of the Prior Art

FIG. 50 shows a two-dimensional data code which has been used in a method for recording digital information by arraying a matrix two-dimensionally on a recording surface (see U.S. Pat. No. 4,939,354). The two-dimensional data code is to record digital information by virtually setting matrix cells corresponding to bits on a recording surface 220 of a recording carrier, and by assigning to each cell a white or black color representing data.

In such a recording method, generally, control information representing the orientation of an information recording area 219 and the size of a cell (data density) is provided for reading convenience's sake. In the example of FIG. 50, as the control information, the perimeter of the rectangular information recording area 219 is provided with a linear portion 212 on its two adjoining sides 221 and a clocking information portion 216 on the remaining two sides 231. The linear portion 212 is formed of adjoining black cells, and the clocking information portion 216 is formed of alternately connected white and black cells. During a reading operation, the orientation of the information recording area 219 is detected due to the linear portion 212, and the size of cells is detected through the clocking information portion 216.

In the above conventional digital information recording method, however, the clocking information portion 216 will be farther away from the data as the size of the information recording area 219 increases. This is because the clocking information portion 216 is provided along the perimeter of the information recording area 219. As a result, due to factors such as distortion of the recording surface 220, characteristics of the reading device (scanner, CCD camera, etc.), or the like, a large difference in data position between recording and reading operations will be caused in the vicinity of the center of the information recording area 219, resulting in reading errors. For example, instead of originally intended information on a cell of the fifth row, the fourth column, the information on the cell of the sixth row, the fifth column may be erroneously read. Consequently, the conventional digital information recording method has a problem that the size of the information recording area 219 cannot be increased and therefore that the storage capacity cannot be increased.

SUMMARY OF THE INVENTION

The present invention has been developed with a view to substantially solving the above described disadvantages and has for its essential object to provide a digital information recording carrier which can prevent the occurrence of reading errors over the entire range of the information recording area even if the size of the information recording area is increased, and therefore which allows the storage capacity to be increased.

Another object of the present invention is to provide a digital information recording method and apparatus which can produce such a digital information recording carrier.

A still further object of the present invention is to provide a digital information decoding method and apparatus which can read and decode digital information recorded on such a digital information recording carrier.

In order to achieve the aforementioned objects, the present invention provides a digital information recording carrier, comprising:

a planar recording surface having an information recording area in which cells corresponding to bits are virtually set in a matrix form, each cell being provided with an optically recognizable mark corresponding to digital information so that the digital information is recorded in the information recording area as a two-dimensional pattern; and specific patterns each consisting of a plurality of cells which are linked together or contiguous and which are given optically recognizable marks in a given pattern, the specific patterns including a predetermined pattern which is placed in an inner portion apart from a perimeter of the information recording area.

In this digital information recording carrier, predetermined patterns are disposed inside, spaced from the perimeter of the information recording area. Therefore, even if the information recording area is distorted in the vicinities of its center, the positions of cells in the vicinities of the center of the information recording area are accurately determined based on the positions of the specific patterns. Accordingly, few or no reading errors will occur in the vicinities of the center of the information recording area even if the size of the information recording area is increased. Also, for the peripheral part of the information recording area, the occurrence of reading errors is prevented by providing clocking information as in the prior art or by providing the specific patterns. As a consequence, it is possible to increase the storage capacity by increasing the size of the information recording area.

In one embodiment, the specific patterns are dispersedly arranged all over the information recording area. In this case, the position of any arbitrary cell is accurately determined over the entire range of the information recording area. As a consequence, it is possible to increase the storage capacity by increasing the size of the information recording area.

In one embodiment, the cells each have a shape of a square of same size. And, each specific pattern is composed of a central closed area with a shape of a square and a loop portion surrounding the central closed area entirely. The central closed area consists of four cells each provided with a light as an optically recognizable mark and the loop portion consists of twelve cells each provided with a dark as an optically recognizable mark.

In another embodiment, each specific pattern is composed of a central portion with a shape of a square, a first loop portion surrounding the central portion entirely, and a second loop portion surrounding the first loop portion entirely. The central portion consists of a single cell provided with a dark as an optically recognizable mark, the first loop portion consists of eight cells each provided with a light as an optically recognizable mark, and the second loop portion consists of sixteen cells each provided with a dark as an optically recognizable mark.

In these cases, it is easy to find the specific patterns in the information recording area. Also, the number of cells constituting the specific pattern is relatively small. Further, when an identical or similar pattern appears nearby as the recorded information, the specific pattern will not easily overlap the nearby pattern. Still, the specific pattern is less affected by dirt or ink blurs during printing. Besides, the algorithm to find the specific patterns becomes simplified.

In one embodiment, the specific patterns are arranged with higher density in a peripheral part of the information recording area than in an interior of the information recording area. In this case, the reading precision for the peripheral part where distortion is more likely to occur due to the reading device characteristics is enhanced so that the occurrence of reading errors is prevented.

In another embodiment, the specific patterns are placed with higher density in the interior of the information recording area than in the peripheral part of the information recording area. In this case, the reading precision for the vicinities of the center of the information recording area is enhanced so that the occurrence of reading errors is prevented.

In one embodiment, the information recording area is a rectangular area having four corners and a specific pattern is placed at each corner. In this case, searching for the specific patterns placed at the four corners allows an easy determination of the range occupied by the information recording area within the recording surface.

In one embodiment, the specific patterns placed at the four corners are different from the specific patterns placed in the other portions of the information recording area. In this case, searching for the specific patterns different from the others allows a still easier determination of the range occupied by the information recording area within the recording surface.

In one embodiment, part of the specific patterns placed at the four corners are different from the rest thereof such that a set of the specific patterns placed at the four corners becomes asymmetrical with respect to a 90°, 180°, or 270° rotation on the recording surface. This arrangement makes it easy to recognize top and bottom or right and left of the information recording area.

In one embodiment, the specific patterns have a light and a dark as the optically recognizable marks, and a light/dark status of some of the specific patterns is inverse to that of the other specific patterns so as to make a contrast against nearby cells in which digital information has been recorded. In this case, it is easy to recognize boundaries between the specific patterns and the surrounding information-recorded cells. This allows an easy search for the specific patterns.

The present invention further provides a digital information recording method, comprising the steps of:

virtually setting cells corresponding to bits in a matrix form in an information recording area provided within a planar recording surface;

placing specific patterns at least in an interior of the information recording area apart from a perimeter of the information recording area, wherein each specific pattern consists of a plurality of cells which are linked together and which are given optically recognizable marks in a given pattern; and providing each of the cells present in regions other than regions occupied by the specific patterns of the information recording area with an optically recognizable mark corresponding to digital information to be recorded so that the digital information is recorded in the information recording area as a two-dimensional pattern.

This digital information recording method can easily produce the digital information recording carriers according to the above-described various embodiments of various types.

In one embodiment, the digital information recording method further comprises the steps of:

comparing light/dark statuses of cells defining a perimeter of each specific pattern with light/dark statuses of information-recorded cells which are immediately adjacent to the perimeter of the specific pattern; and inverting, if the compared light/dark statuses are coincident with each other, the light/dark statuses of constituent cells of the specific pattern such that the specific pattern is distinguished from the adjacent information-recorded cells.

In this case, it is easy to recognize the boundaries between the specific patterns and the information-recorded cells immediately adjacent to the specific patterns on the recording surface of the generated digital information recording carrier. This allows an easy search for the specific patterns.

The present invention also provides a digital information recording apparatus which comprises the steps of:

searching the information recording area for the specific patterns to determine their positions;

calculating positions of arbitrary information-recorded cells by a proportional allocation technique, based on positions of four specific patterns out of all the searched specific patterns, the four specific patterns being placed on two given rows and two given columns;

reading bit information of each cell located at the calculated position; and reproducing the digital information recorded on the recording surface based on the read bit information.

In order to decode the digital information recorded on the digital information recording carrier wherein the cells each have a shape of a square of same size, wherein each specific pattern is composed of a central closed area with a shape of a square and a loop portion surrounding the central closed area entirely, and wherein the central closed area consists of four cells each provided with a light as an optically recognizable mark and the loop portion consists of twelve cells each provided with a dark as an optically recognizable mark, the step of searching the information recording area for the specific patterns comprises the sub-steps of:

checking the light/dark status of a reference position for a search for the central closed area of the specific pattern, to decide that the reference position is contained in the central closed area if the light/dark status of the reference position is a light; and checking a region occupied by lights which are linked to each other, the reference position being included in the region, as to whether or not size, width, and height of the region are within certain ranges, respectively, to confirm that the region is the central closed area.

Further, in order to decode the digital information recorded on the digital information recording carrier wherein each specific pattern is composed of a central portion with a shape of a square, a first loop portion surrounding the central portion entirely, and a second loop portion surrounding the first loop portion entirely, and wherein the central portion consists of a single cell provided with a dark as a mark, the first loop portion consists of eight cells each provided with a light as a mark, and the second loop portion consists of sixteen cells each provided with a dark as a mark, the step of searching the information recording area for the specific patterns comprises the sub-steps of:

checking the light/dark status of a reference position for a search for the central closed area of the specific pattern, to decide that the reference position is contained in the central closed area if the light/dark status of the reference position is a dark;

checking a first dark region occupied by darks which are linked to each other, the reference position being included in the first dark region, as to whether or not size, width, and height of the first dark region are within certain ranges, respectively, to confirm that the first dark region is the central closed area; and confirming, when a second dark region appears within a certain distance upward, downward, rightward or leftward from the first dark region after a light region has appeared and when a loop has been made around a boundary between the light region and the second dark region, that the light region is the first loop portion.

The present invention further provides a digital information recording apparatus for recording digital information as a two-dimensional pattern in an information recording area provided within a planar recording surface, wherein cells corresponding to bits are virtually set in a matrix form in the information recording area and the recording of digital information is executed by providing an optically recognizable mark corresponding to the digital information to each of the cells. In the digital information recording apparatus, input means take in digital information to be recorded into the digital information recording apparatus. Then, pattern generating means generate a two-dimensional pattern to be printed onto the recording surface, by placing specific patterns inside of the information recording area apart from its perimeter, the specific patterns being each formed of a plurality of linked cells provided with optically recognizable marks in a given pattern, and by placing the digital information in regions of the information recording area other than regions occupied by the specific patterns. Finally, printing means print the two-dimensional pattern generated by the pattern generating means onto the recording surface. Using this digital information recording apparatus allows an easy generation of the aforementioned various types of digital information recording carriers.

Further, the present invention provides a digital information decoding apparatus for reading and decoding digital information from the aforementioned various types of digital information recording carriers. In the digital information decoding apparatus, reading means read the two-dimensional pattern recorded on the recording surface and output information representing the two-dimensional pattern. Then, information decoding means reproduce the digital information recorded on the recording surface in the following way. The information decoding means first search inside of the two-dimensional pattern represented by the output information of the reading means for the specific patterns to determine positions thereof, then calculate positions of arbitrary information-recorded cells by a proportional allocation technique based on the positions of four specific patterns out of all the searched specific patterns, the four specific patterns being placed on two given rows and two given columns, then read bit information of each cell located at the calculated position, and then reproduce the digital information recorded on the recording surface based on the read bit information. Finally, output means output the digital information reproduced by the information decoding means. Using this apparatus allows an easy decoding of digital information recorded on the digital information recording carrier.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 shows a preferred example of the specific pattern;

FIG. 7 shows another preferred example of the specific pattern;

FIGS. 8A, 8B, 8C, 8D, 8E, 8F, and 8G show different examples of the specific pattern;

DETAILED DESCRIPTION OF THE PREFERRED EMBODIMENTS (1) Basic Construction of Digital Information Recording Carrier FIG. 1 shows a digital information recording carrier according to one embodiment of the present invention, wherein two-dimensional patterns of digital information are shown in detail. FIG. 2 schematically illustrates the recording carrier wherein the two-dimensional patterns are schematically shown. The carrier is a sheet of paper in this example.

Figure 1:
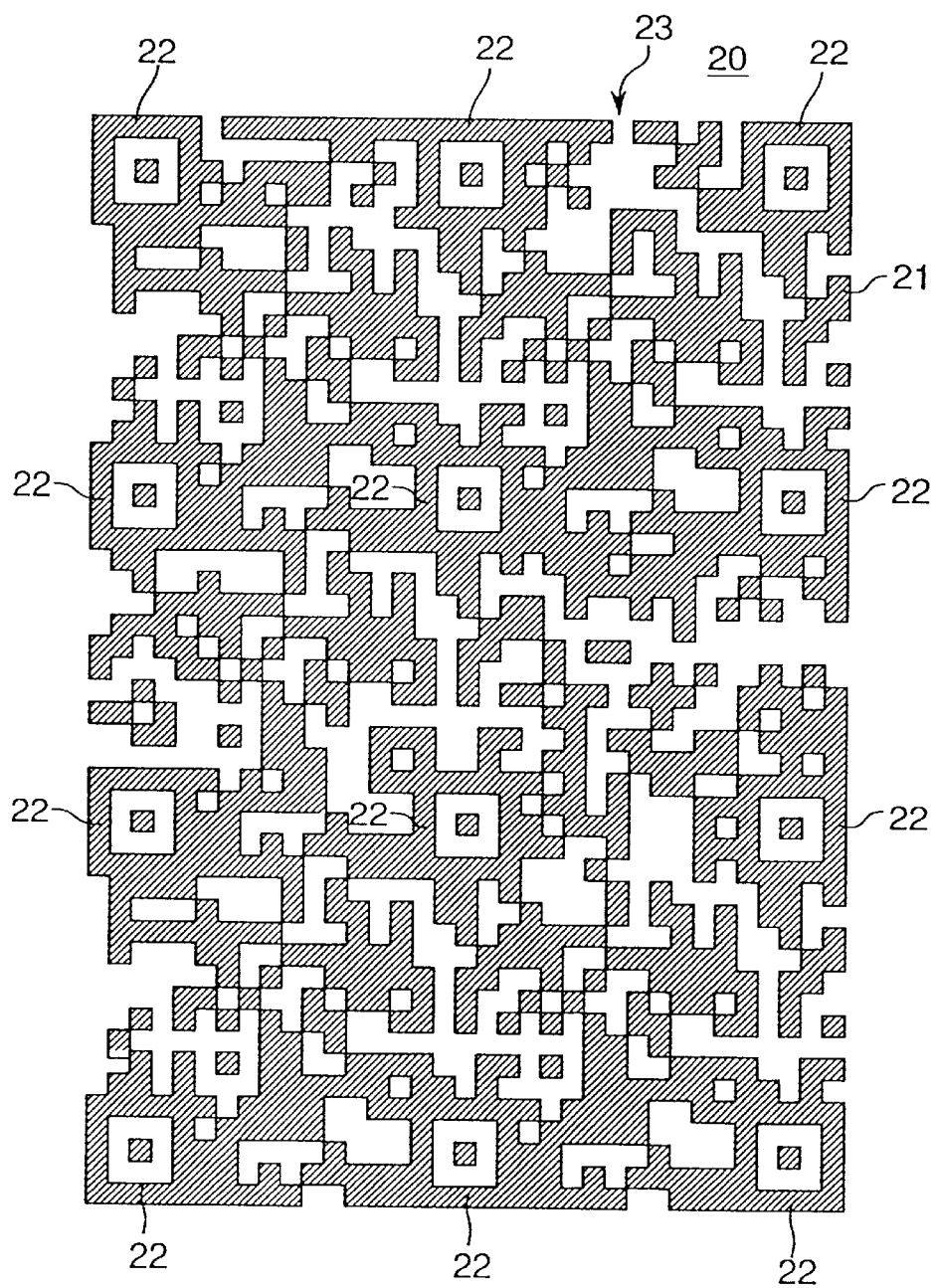
FIG. 1 is a plan view showing a digital information recording carrier according to one embodiment of the present invention.

On a recording surface 20 of this digital information recording carrier, matrix-shaped square cells corresponding to bits of digital information are virtually set and each provided with a white (a light) representing a "0" or a black (a dark) representing a "1" as an optically recognizable mark (in the drawings, the black is expressed by hatching for the sake of convenience). With this provision, digital information is recorded as two-dimensional patterns on the recording surface 20.

Figure 2:
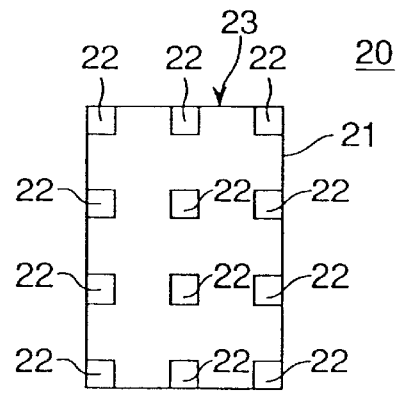
FIG. 2 schematically illustrates the digital information recording carrier of FIG. 1.

On the recording surface 20, within a rectangular information recording area 23 where information is actually recorded, a plurality of specific patterns 22 are placed at clearances among regions 21 representing the recorded information proper. The specific patterns 22 are each composed of a plurality of cells provided with whites and blacks in a specific pattern. In this example, twelve specific patterns 22 (longitudinal 4 X transverse 3=12) are placed in a matrix shape at constant longitudinal and transverse spacings in the rectangular information recording area 23. As can be well understood from FIG. 2, ten specific patterns 22 belonging to the top and bottom rows and the right and left columns are placed along the perimeter of the information recording area 23, while the remaining two specific patterns 22 are placed in an internal region (near the center) separated from the perimeter of the information recording area 23. It is noted that a specific pattern 22B as shown in FIG. 7 is adopted as the specific pattern 22 in this example (the specific patterns themselves will be detailed later).

When specific patterns 22 are placed inside of the information recording area 23 apart from its perimeter, it is possible to correctly read out recorded digital information even if the recording surface 20 is distorted more or less.

Figure 3A:
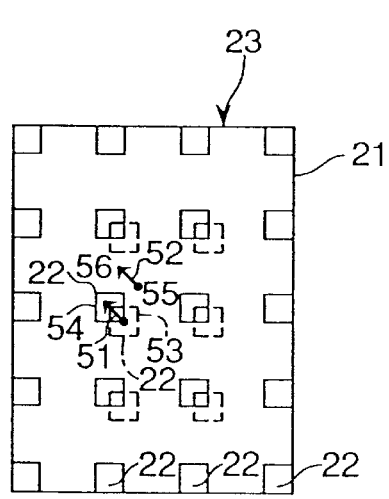
FIG. 3A is an explanatory view showing a state in which a distortion has occurred on a recording surface of the digital information recording carrier.
Figure 3B:
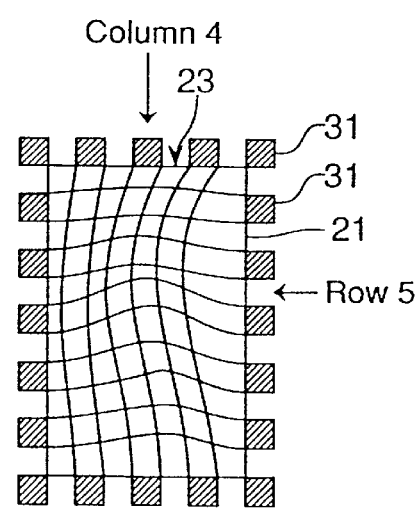
FIG. 3B is an explanatory view showing a state in which a distortion has occurred on a recording surface of a prior art digital information recording carrier.

For example, as shown in FIG. 3B, with an arrangement that only clocking information 31 is provided along the perimeter of the information recording area 23 as in the prior art, there will be cases that information recorded in the inner portion of the information recording area 23 apart from its perimeter, for example, on the cell of row 6, column 5, is erroneously read out instead of the originally intended information on the cell of row 5, column 4 when the recording surface has been distorted. In contrast to this, when the specific patterns 22 are disposed inside of the information recording area 23 apart from its perimeter as described above, the specific pattern 22 shifts, for example, from an original position 53 to a position 54 according to a possible distortion of the recording surface 20, as shown in FIG. 3A. Accordingly, for reading information of a cell (originally placed at a position 55), the actual position 56 of the cell can be known based on a shift amount 51 (shown by arrow in FIG. 3A) of an adjacent specific pattern 22. Thus, the information recorded at the cell can be read correctly.

What matters here is the difference between a shift amount 52 of a cell to be read and the shift amount 51 of the adjacent specific pattern 22. If this difference is large (for example, in excess of the one-cell extent), there would occur a reading error. However, by narrowing the interval between the specific patterns 22, 22 so that a cell to be read and the specific pattern are made closer to each other, such reading errors can be reduced.

Conversely, the interval between the specific patterns 22, 22 should be set narrow to such an extent that the positional shift of the cell to be read can be corrected based on the shift amount of the specific pattern 22. However, narrowing the interval between the specific patterns 22, 22 too much would increase the number of specific patterns 22 contained in the information recording area 23 too much, so that the amount of recorded information is lessened accordingly. Therefore, from the two viewpoints, the interval of the specific patterns 22, 22 is set to a proper value.

Figure 4:
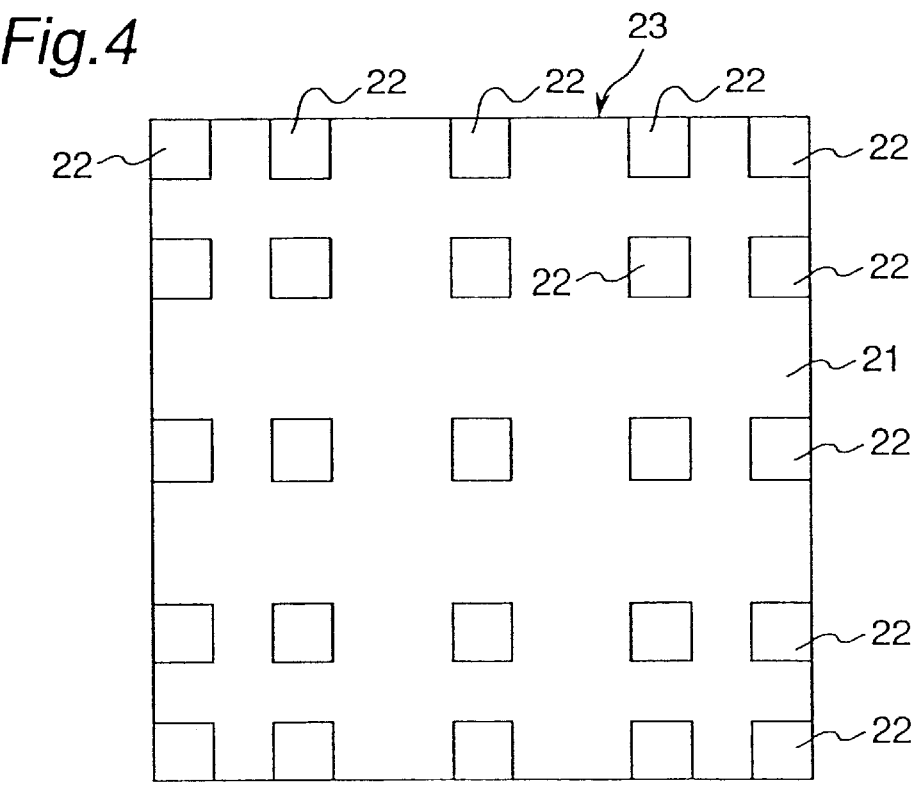
FIG. 4 schematically illustrates an example in which specific patterns are placed with a high density in peripheral parts of the information recording area.

When information is read from this information recording carrier by using a line sensor or a CCD camera, distortion is more likely to occur at both ends of the line sensor or in the peripheral part of the field of view of the CCD camera. In such a case, specific patterns should be distributed with higher density in peripheral part of the information recording area 23 than in the other parts, as shown in FIG. 4. That is, depending to the characteristics of the reading device, the specific patterns 22 are distributed with higher density at places where relatively large reading distortions are likely to occur. Thus, reading errors can be reduced.

Figure 5:
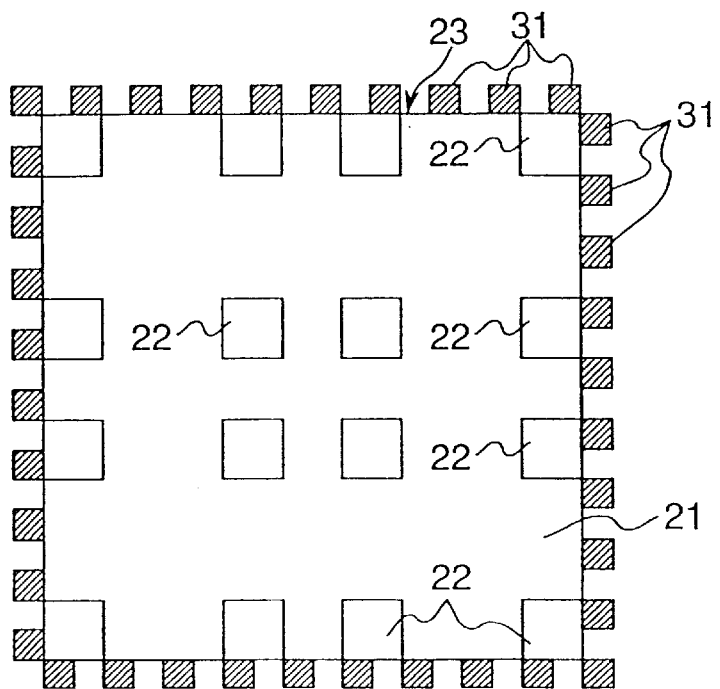
FIG. 5 schematically illustrates an example in which the specific patterns are placed with a higher density in a central part of the information recording area.

When the specific patterns 22 are placed within the information recording area 23 and clocking information 31 is provided around the information recording area 23, as shown in FIG. 5, the specific patterns 22 are expected to serve as a complement of the clocking information 31. Accordingly, in this case, it is desirable to distribute the specific patterns 22 with high density in a portion where with only the clocking information 31, reading errors would be more likely to occur. Such portion is a central part of the information recording area 23.

In these cases, the longitudinal and transverse intervals between the specific patterns 22, 22 are either the same or different ones.

However, when the specific patterns 22, 22 are placed at different intervals within the information recording area 23, it is necessary in performing a read operation that locations of the specific patterns 22 are previously known or can be known at the beginning of the reading process. For the locations of the specific patterns 22 to be known at the beginning of reading process, it is enough that the locations of the specific patterns of the top row, for example, are previously determined and that the information on the locations of the other specific patterns 22 can be read out, based on information on cells in proximity to the specific patterns of the top row which are previously determined.

If the decoding apparatus has previously learned the locations of the specific patterns 22, it is not necessary for the specific patterns 22 to be in contact with the perimeter of the information recording area 23, nor to be arranged into a lattice shape. The specific patterns 22 can be disposed freely.

(2) Preferred Examples of the Specific Pattern

In order for the specific pattern 22 to be preferable, the specific pattern 22 should meet the following conditions (a) to (e):

(a) The specific pattern has a feature (a specific white-and-black pattern) that can be easily found within the information recording area 23;

(b) The number of cells constituting the specific pattern is relatively small;

(c) When an identical or similar pattern has appeared nearby as the recorded information, the specific pattern will not easily overlap with the nearby pattern;

(d) The specific pattern is less affected by dirt during printing or ink blurs; and (e) The algorithm for finding the specific pattern is simple.

FIG. 6 shows a preferred example 22A of the specific pattern 22. This specific pattern 22A is composed of a central closed area 44 comprising four whitened cells of two rows x two columns, and a loop portion 45 comprising twelve blackened cells surrounding the central closed area 44. As a whole, the specific pattern 22A forms a square block containing totally 16 cells of four rows x four columns.

FIG. 7 shows another preferred example 22B of the specific pattern 22. This specific pattern 22B is composed of a central portion 41 consisting one blackened cell, a first loop portion 42 consisting of eight whitened cells surrounding the central portion 41, and a second loop portion 43 consisting of sixteen blackened cells further surrounding the first loop portion 42. As a whole, the specific pattern 22B forms a square block containing totally 25 cells of 5 rows x 5 columns.

FIGS. 8A to 8G show various further examples 22C to 22I of the specific pattern 22.

The specific pattern 22C shown in FIG. 8A is composed of a central portion consisting of one blackened cell, and a loop portion consisting of eight whitened cells surrounding the central portion. As a whole, the specific pattern 22C forms a square block containing totally nine cells of 3 rows x 3 columns.

The specific pattern 22D shown in FIG. 8B is a square block containing totally 25 cells of 5 rows x 5 columns. The cells within the block are alternately blackened and whitened into a checkered pattern.

The specific pattern 22E shown in FIG. 8C is a square block containing totally 25 cells of 5 rows x 5 columns. The cells on the diagonal lines within the block are blackened into an X-shaped pattern.

The specific pattern 22F shown in FIG. 8D is composed of a central closed area consisting of nine whitened cells of 3 rows x 3 columns, and a loop portion consisting of 16 blackened cells surrounding the central closed area in a loop. As a whole, the specific pattern 22F forms a square block containing totally 25 cells of 5 rows x 5 columns.

The specific pattern 22G shown in FIG. 8E is a modification of the specific pattern 22E shown in FIG. 8C, wherein the cells in the middles of the top, bottom, right, and left sides in the specific pattern 22E have been eliminated.

The specific pattern 22H shown in FIG. 8F is a square block containing totally 35 cells of 7 rows x 5 columns. The blackened cells within the block form a generally S-shaped pattern.

Finally, the specific pattern 22I shown in FIG. 8G is composed of a central portion consisting of one whitened cell, and a loop portion comprising eight blackened cells surrounding the central portion in a loop. As a whole, the specific pattern 22I forms a square block containing totally nine cells of 3 rows x 3 columns.

As shown above, various types of patterns can be adopted as the specific pattern 22, whereas the specific patterns 22A, 22B shown in FIGS. 6, 7 are preferable to the other specific patterns 22C to 22I. The reasons (i) to (v) of this are described below in conjunction with the above conditions (a) to (e).

(i) First, advantageously, the specific patterns 22A, 22B can be extracted from within the information recording area 23 relatively easily. The specific pattern 22D of checkered pattern as shown in FIG. 8B would be buried in the information recording area 23 so as not to be found out, whereas the specific patterns 22A, 22B can be discerned even by the naked eye. In particular, when the specific patterns 22A, 22B are previously known to have been placed into a lattice shape, they can be found out even more easily.

(ii) Second, the specific patterns 22A, 22B each are composed of a relatively small number of cells, as small as 16 cells for the specific pattern 22A and 25 cells for the specific pattern 22B. It is another advantage.

(iii) Third, when an identical pattern has appeared nearby the specific patterns 22A, 22B as the recorded information, the specific patterns 22A and 22B will not easily overlap with the nearby pattern. It is a further advantage.

Figure 9:
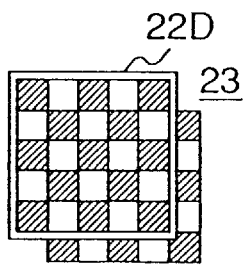
FIG. 9 shows a state in which a checkered specific pattern shown in FIG. 8B overlaps with an identical pattern that has appeared nearby.

FIG. 9 shows an example in which, with the use of the specific pattern 22D of checkered pattern as shown in FIG. 8B, an identical pattern has appeared nearby as the recorded information. In the case of the specific pattern 22D, there is a possibility that an identical pattern will appear at a location shifted longitudinally by one cell and also transversely by one cell. If the length of one cell side is assumed to be a one (1), the minimum distance between the specific pattern 22D and the identical pattern is $2^{1/2}$.

Figure 10:
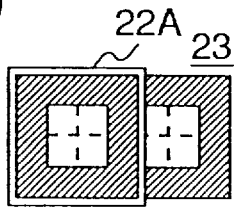
FIG. 10 shows a state in which the specific pattern of FIG. 6 has overlapped with an identical pattern that has appeared nearby.
Figure 11:
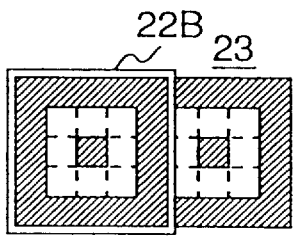
FIG. 11 shows a state in which the specific pattern of FIG. 7 has overlapped with an identical pattern that has appeared nearby.

FIG. 10 shows an example in which, with the use of the specific pattern 22A, an identical pattern has appeared nearby as the recorded information. In the case of this specific pattern 22A, an identical pattern could appear only at locations shifted by three cells longitudinally or transversely from the specific pattern. Also, FIG. 11 shows an example in which, with the use of the specific pattern 22B, an identical pattern has appeared nearby as the recorded information. In the case of this specific pattern 22B, an identical pattern could appear only at locations shifted by four cells longitudinally or transversely from the specific pattern. Like this, either of the specific patterns 22A and 22B, even if an identical or similar pattern has appeared nearby as the recorded information, overlaps with the pattern to relatively small extent, so that the specific pattern and the pattern representative of the recorded information will be shifted from each other to some extent. From this characteristic, the specific patterns 22A, 22B can be said to be patterns that can be relatively easily discriminated from the recorded information by the reading device.

Measures to be taken when the specific pattern 22 and an identical pattern overlap with each other will be described later in detail in the paragraphs describing a decoding method.

(iv) Fourth, the specific patterns 22A, 22B are less affected by dirt, ink blurs or the like. This feature is a further advantage.

Figure 12:
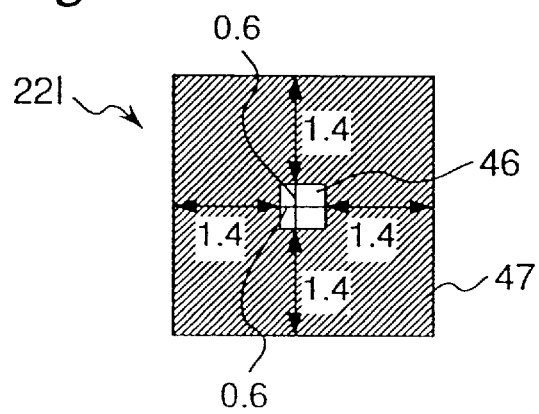
FIG. 12 is an explanatory view showing an aspect of the specific pattern as shown in FIG. 8G where each black cell has blurred to a 1.4 times expansion.

Generally, in printing onto paper, black cells tend to spread due to the ink blurs, invading white cells. In the specific pattern 22I as shown in FIG. 8G, as an example, one white cell is surrounded by black cells, in which case the white cell tends to be crushed. If ink blurs eventually expand a black cell 47 to 1.4 times the length of each side as shown in FIG. 12, the resulting area size of the white cell 46 at the center of the specific pattern 22I will be as small as 36% of the normal one.

Figure 13:
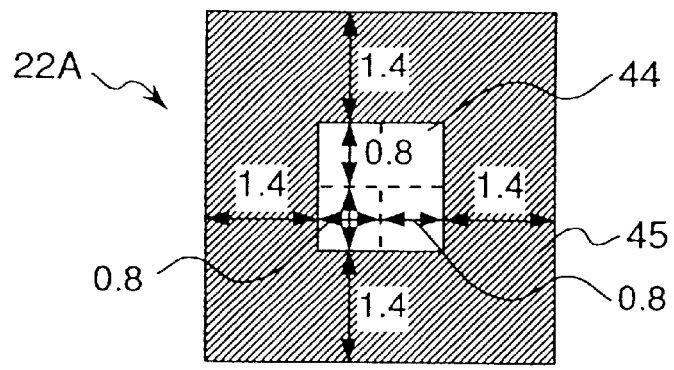
FIG. 13 is an explanatory view showing an aspect of the specific pattern of FIG. 6 where each black cell has blurred to a 1.4 times expansion.
Figure 14:
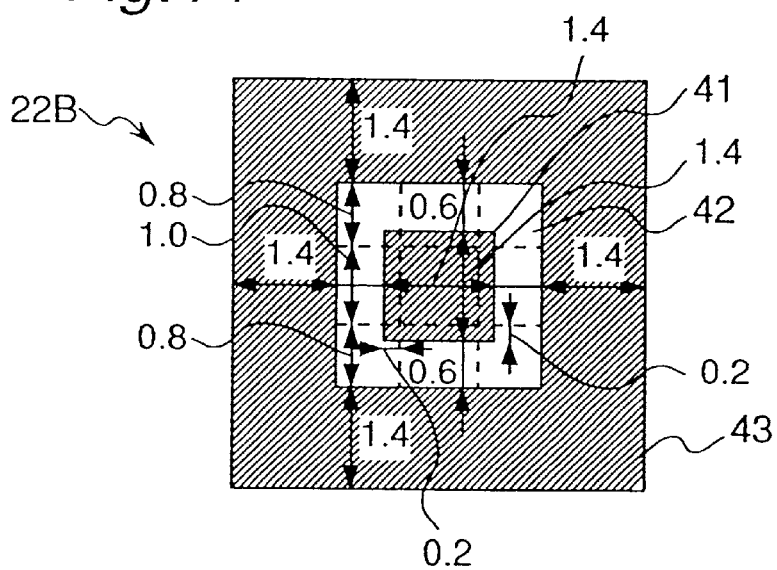
FIG. 14 is an explanatory view showing an aspect of the specific pattern of FIG. 7 where each black cell has blurred to a 1.4 times expansion.
Figure 15:
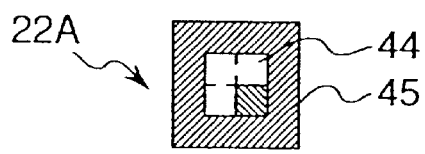
FIG. 15 is a view showing an aspect of the specific pattern of FIG. 6 where one of the white cells constituting a central closed area has changed to a black cell.

In contrast to this, the specific pattern 22A ensures 64% of the normal size of the central closed area (four white cells) 44, as shown in FIG. 13. Also, the specific pattern 22B ensures 60% of the normal size of the first loop portion (eight white cells) 42, as shown in FIG. 14. Besides, with the specific pattern 22A, even when one of the four white cells constituting the central closed area 44 has been thoroughly crushed (i.e., changed to a black cell) due to dirt or the like as shown in FIG. 15, the feature, 'a white closed area surrounded by a black frame,' is maintained, so that adopting a reading method utilizing this feature allows the avoidance of effects of dirt.

(v) Fifth, advantageously, either of the specific patterns 22A, 22B needs a simple reading algorithm.

As the reading algorithm, commonly used is a method by which cells are cut out from the recording surface and then the values (white or black in this example) of the cut-out cells are examined. Therefore, a similar method is conceivable for the recognition of the specific pattern 22, that is, the cells constituting the specific pattern 22 are cut out and then the values of all the cells contained in the specific pattern 22 are examined.

Another conceivable method for the recognition of the specific pattern 22 examine the pattern without performing the cut-out in the unit of cells. For example, the specific pattern 22B shown in FIG. 7 will be found out by determining, first, whether or not the central portion (black cell) 41 forms a closed area surrounded by white cells, and then whether or not the first loop portion (white cells) 42 forms a closed area surrounded by black cells. Also, the specific pattern 22A shown in FIG. 6 will be found by determining whether or not the central closed area 44 has an area size corresponding to four cells. In either case, it is required only to see whether or not features of a read portion are coincident with the features of the specific pattern 22A, 22B, that is, whether or not the read portion meets the required conditions for the specific pattern. Values of the cells are not examined. However, this method will do enough for practical use, where even if another pattern is misrecognized as the specific pattern, such misrecognized patterns can be neglected by, for example, checking, after all specific patterns are extracted, whether or not the extracted specific patterns are arranged into a lattice shape. In such a case, higher precision check is optionally performed only to such specific patterns that are considered to be more likely to have been misrecognized. In this way, the specific patterns 22A, 22B are recognized by a simple algorithm.

As shown above, the specific patterns 22A, 22B have many advantages over the other specific patterns, and hence are preferable specific patterns.

(3) Recognition of Specific Patterns

Figure 16:
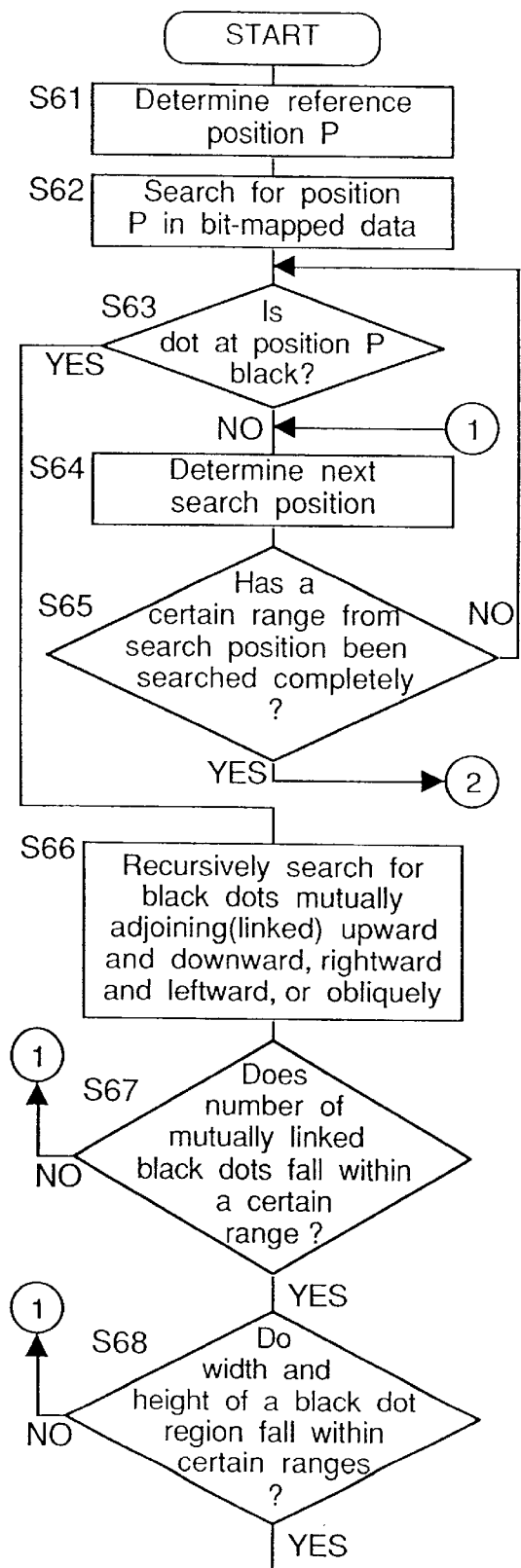
FIG. 16 is a flow chart of the processing for recognizing the specific pattern of FIG. 7.
Figure 16:
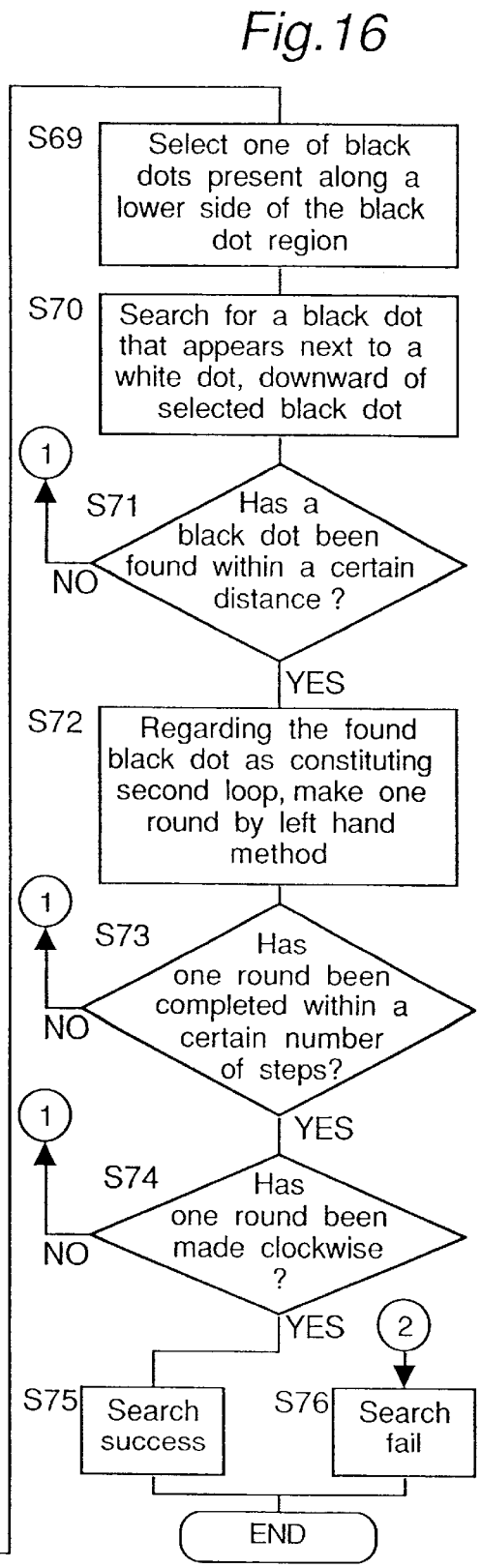

FIG. 16 shows an example of the processing flow for recognizing the specific pattern 22B shown in FIG. 7.

It is assumed that the recognition process is applied to bit-mapped data read by a reading device.

First, when the specific patterns 22B are placed within the information recording area 23 according to a predetermined arrangement, a position where a specific pattern 22B will appear in the bit-mapped data is predicted, whereby a reference position P serving as a search reference in the bit-mapped data is determined (S61). Then, the reference position P is searched for in the bit-mapped data (S62). Then, it is examined whether or not a dot at the reference position P is black (S63). If the dot is black, the dot is assumed to constitute the central portion 41, and the processing flow goes to step S66.

On the other hand, if the dot of the reference position P is decided not to be black at step S63, the next search position is determined within a certain range from the reference position P (S64), and it is again examined whether or not the dot of the search position is black. If as a result of searching all the certain range from the reference position P, a black dot corresponding to the central portion 41 of the specific pattern 22B is not found (S65), then the search is decided to have failed (S76), and the processing is ended.

At step S66, black dots adjoining (in other words, linked) to each other in a longitudinal direction (upward or downward), in a transverse direction (rightward or leftward), or in an oblique direction, are recursively searched for, starting with a dot next to the dot of the search position at which search for a black dot has been successful. Then, it is decided whether or not the number of the adjoining black dots searched for is within a certain range (S67). If the number of the adjoining black dots exceeds an upper limit of the range, it is decided that the region (referred to "black dot region" below) occupied by the adjoining black dots is not closed, or that the black dot region, even if closed, has too large an area for the central portion 41. Also, if the number of the adjoining black dots is less than a lower limit of the range, it is decided that the black dot region is not the central portion 41 but merely noise. In these cases where the number of the adjoining black dots is out of the certain range, the processing flow returns to S64 to redo processing.

Then, if the number of the adjoining black dots is within the certain range (S67), then the processing flow goes to S68, where it is examined whether or not the width and height of the black dot region are within respective certain ranges, whereby the shape of the black dot region is checked. The width of the black dot region is expressed in the form of a difference between a maximum and minimum X-coordinates of the region, while the height of the black dot region is similarly expressed in the form of a difference between a maximum and minimum Y-coordinates of the region. If the width or the height of the black dot region is out of the certain range, then the processing flow returns to S64 to redo processing.

Further, if the width and height of the black dot region are within the certain ranges (S68), then the region is decided to be the central portion 41, where the flow proceeds to S69.

Figure 17:
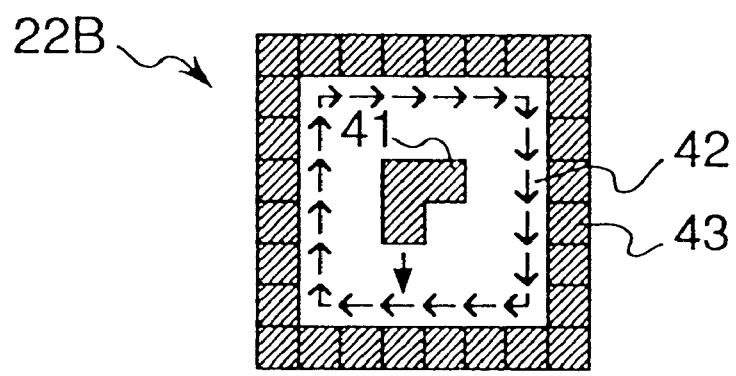
FIG. 17 is an explanatory view showing a way of verifying a second loop portion by taking a round on the boundary between first and second loop portions by a left hand method, for the recognition of the specific pattern of FIG. 7.
Figure 18:
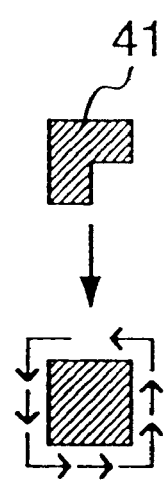
FIG. 18 is an explanatory view showing how the closed region of black dots is traced by the left hand method of FIG. 17.

Next, at step S69, the first loop portion 42 starts to be checked. One of the black dots located along a lower side of the black dot region is selected (S69), the black dot region having been decided to be the central portion 41. The black dots located along the lower side have a Y-coordinate having a smallest value. Then, as indicated by arrow in FIG. 17, a search is made downward of the region 41 for a black dot (regarded as a black dot constituting part of the second loop portion 43) that appears next to a white dot (regarded as a white dot constituting part of the first loop portion 42) (S70). If the next black dot has not been found within a certain distance from a first white dot of a white dot region, the white dot region is decided to be other than the first loop portion 42 of the specific pattern 22B (S71), where the processing flow returns to S64 to redo processing. Meanwhile, if the next black dot has been found within the certain distance from the first white dot (S71), the black dot is regarded as constituting part of the second loop portion 43 of the specific pattern 22B. Then, as indicated by arrow in FIG. 17, the inner perimeter of the region regarded as the second loop portion 43, i.e., the boundary between black and white dots is traced to one round by the left-hand method (a method of tracking a wall of a maze with the left hand on the wall) (S72). If the one round has not been completed within a certain number of steps, it is decided that the white dot region is not closed or that the region, even if closed, is too large (S73). Also, if the one-round tracing by the left hand method has been made counterclockwise, it can be considered not that the white dot region is closed but that some closed region of black dots is being searched for, as shown in FIG. 18 (S74). In these cases, the processing flow returns to S64, where the processing is redone. When the processing successfully proceeds to step S74 and it is decided there that the one-round tracing by the left hand method has been made clockwise, the search for the specific pattern 22B is considered to be successful, which means that the specific pattern 22B has been recognized (S75).

In this way, the specific pattern 22B is recognized by a simple algorithm.

Figure 19:
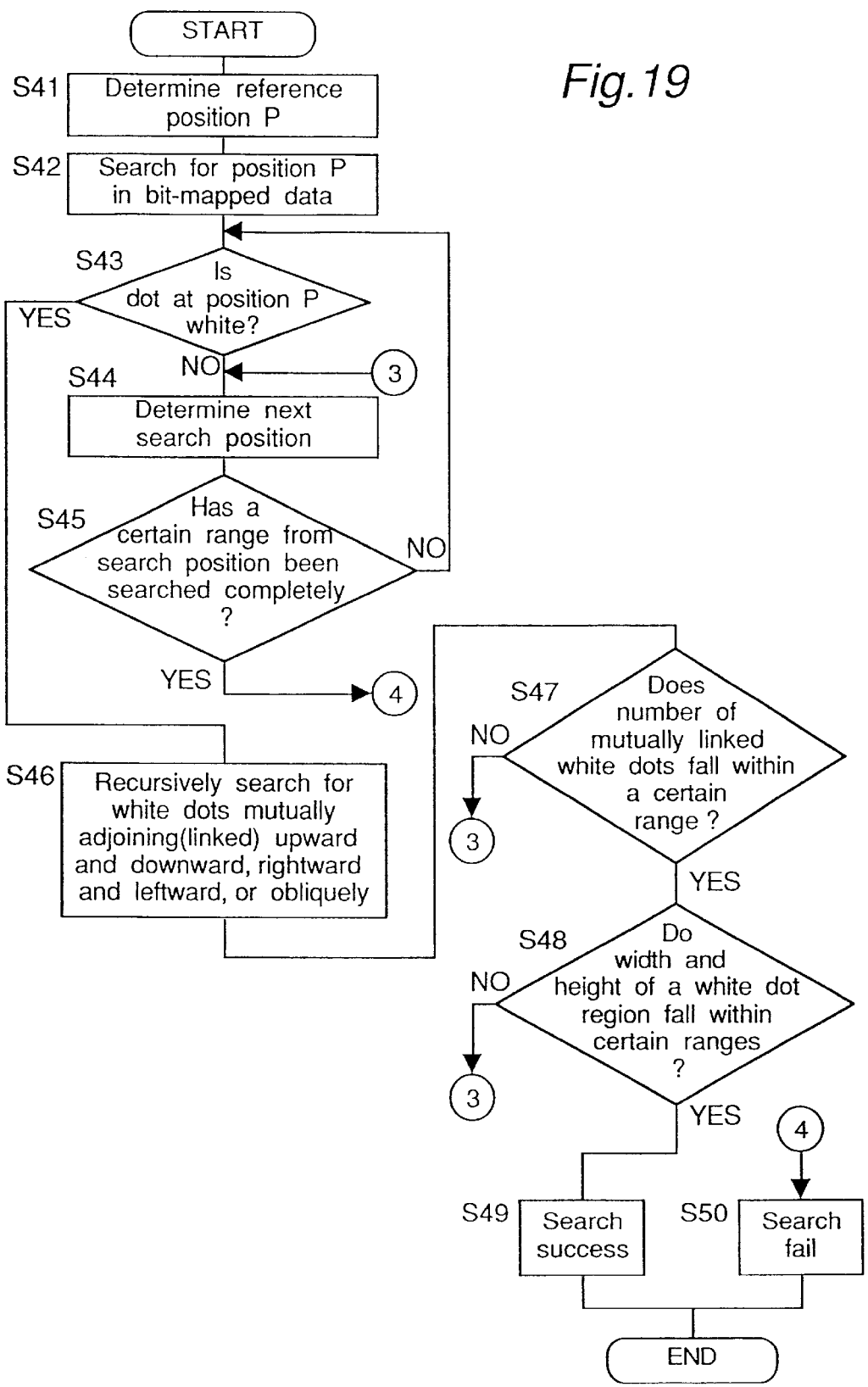
FIG. 19 is a flow chart of the processing for recognizing the specific pattern of FIG. 6.

FIG. 19 shows an example of the processing flow for recognizing the specific pattern 22A shown in FIG. 6.

First, when the specific patterns 22A are placed within the information recording area 23 according to a predetermined arrangement, a position where a specific pattern 22A will appear in the bit-mapped data is predicted whereby a reference portion P serving as a search reference in the bit-mapped data is determined (S41). Then, the reference position P is searched for in the bit-mapped data (S42). Then, it is examined whether or not a dot at the reference position P is white (S43). If the dot is white, the dot is assumed to constitute part of the central closed area 44, and the processing flow goes to step S46.

On the other hand, if the dot of the reference position P is decided not to be white at step S43, the next search position is determined within a certain range from the reference position P (S44), and it is again examined whether or not a dot at the search position is white. If as a result of searching all the certain range from the reference position P, a white dot corresponding to part of the central closed area 44 of the specific pattern 22A has not been found (S45), then the search is decided to have failed (S50), and the processing is ended.

At step S46, white dots adjoining (that is, linked) with each other in a longitudinal direction (upward or downward), in a transverse direction (rightward or leftward), or in an oblique direction, are recursively searched for, starting with a dot next to the dot of the search position at which search for a white dot has been successful. Then, it is decided whether or not the number of mutually linked white dots found falls within a certain range (S47). If the number of the linked white dots exceeds an upper limit of the range, it is decided that the region (referred to "white dot region" below) occupied by the adjoining white dots is not closed, or that the white dot region, even if closed, has too large an area for the central closed area 44. Also, if the number of the mutually linked white dots is less than a lower limit of the certain range, the white dot area is decided to be not the central closed area 44 but merely noise (S48). In these cases where the number of the linked white dots found is out of the certain range, the processing flow returns to S44 to redo processing.

Then, if the number of the adjoining or linked white dots is within the certain range, then the processing flow goes to S48, where it is examined whether or not the width and height of the white dot region are within respective certain ranges, whereby the shape of the white dot region is checked. The width of the white dot region is expressed in the form of a difference between a maximum and minimum X-coordinates of the region, while the height of the white dot region is similarly expressed in the form of a difference between a maximum and minimum Y-coordinates of the region. If the width or the height of the white dot region is out of the certain range, then the processing flow returns to S44 to redo processing.

Further, if the width and height of the white dot region are within the certain ranges, then the region is decided to be the central portion 44, and the flow proceeds to S49 at which the search for the specific pattern 22A is decided to be successful, which means that the specific pattern 22A is regarded as having been successfully recognized.

In this way, the specific pattern 22A is recognized by a simple algorithm.

The processing flows shown in FIGS. 16 and 19 are merely to check about some of the requirements for makeup of the specific patterns 22A and 22B, but allow the specific pattern 22A and 22B to be recognized with almost no problem for practical use. Still, they are efficient.

(4) Shape of Cells

The description has been made hereinabove on a case where the cells constituting the information recording area 23 are of a square shape. However, the shape of the cells is not limited to square.

As will be described later, when using a reading method in which recorded information is read by a reading device so as to form bit-mapped data and the resulting bit-mapped data is analyzed, it is necessary for one cell to have a size of about 4 x 4 dots or 3 x 3 dots or more on the bit map. In such a case, by making each cell shaped into a square, the cell is given a minimum area necessary for the analysis of the bit map. Therefore, square cells are advantageous.

However, this applies only to the bit-mapped data. Otherwise, for example, with the use of a scanner having line sensors with 200 dpi for the primary scan direction and 400 dpi for the sub-scan direction (the 400 dpi is realized through adjustment of the speed of the paper feed motor), it is advantageous to employ such a rectangular cell that the ratio of longitudinal to transverse length is 1:2 on the recording carrier in order that the cell can be read as a square on the bit map.

Figure 20:
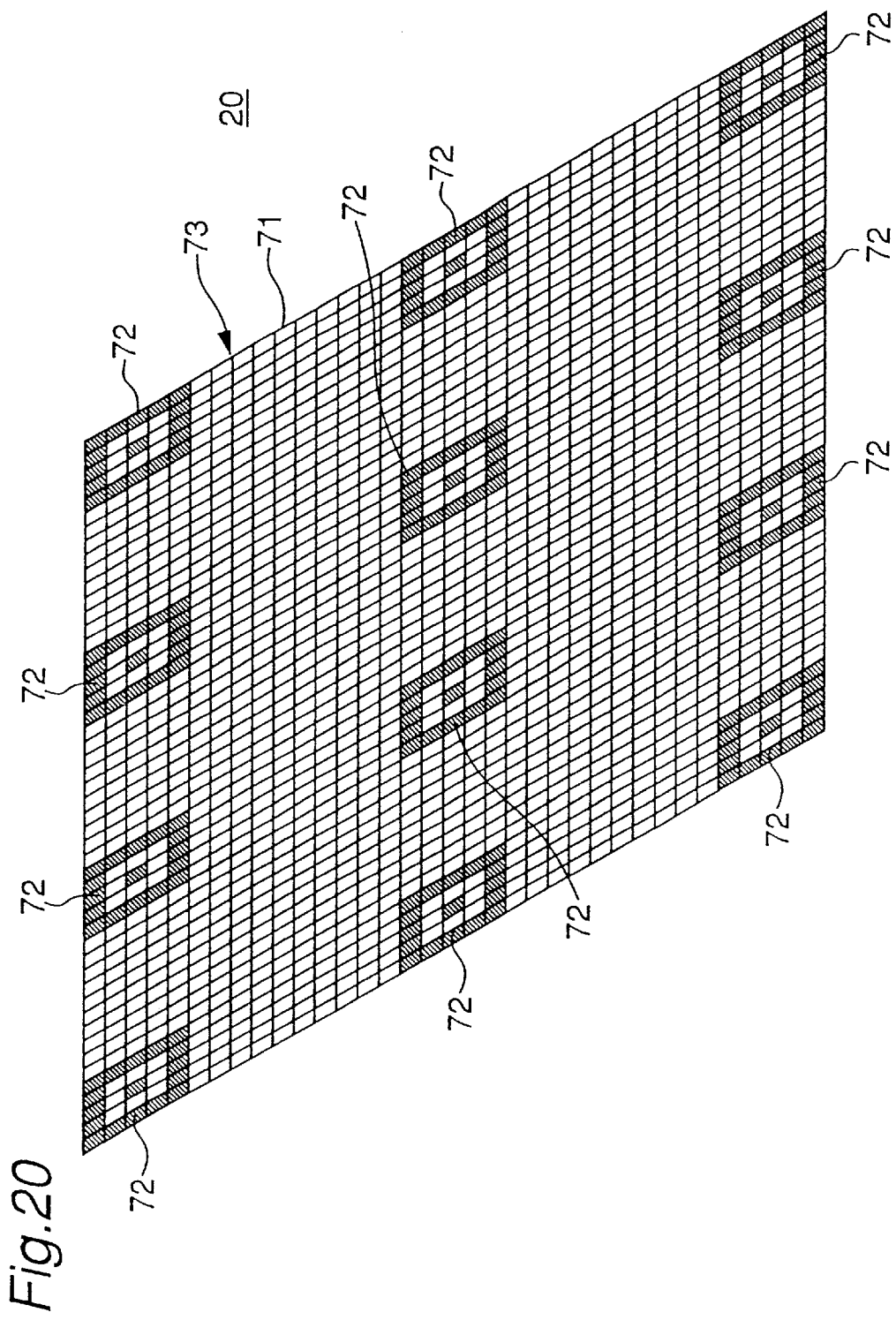
FIG. 20 is a view showing an example in which specific patterns are placed in an information recording area composed of parallelogrammic cells.

Also, the cell can be formed into a parallelogrammic or other shape whose sides do not cross orthogonally, or a polygon such as a triangle or hexagon. In short, the cell has only to be formed into such a shape that the recording surface 20 is filled with the cells without clearances. For example, FIG. 20 shows an example in which an information recording area 73 is made up with cells of parallelogram on the recording surface 20, and in which specific patterns 72 are arranged at regular intervals in this information recording area 73. The specific pattern 72 used in this example is a parallelogram formed by deforming the specific pattern 22B of FIG. 7 in one direction. Reference Numeral 71 denotes cells representing the recorded information.

Figure 21:
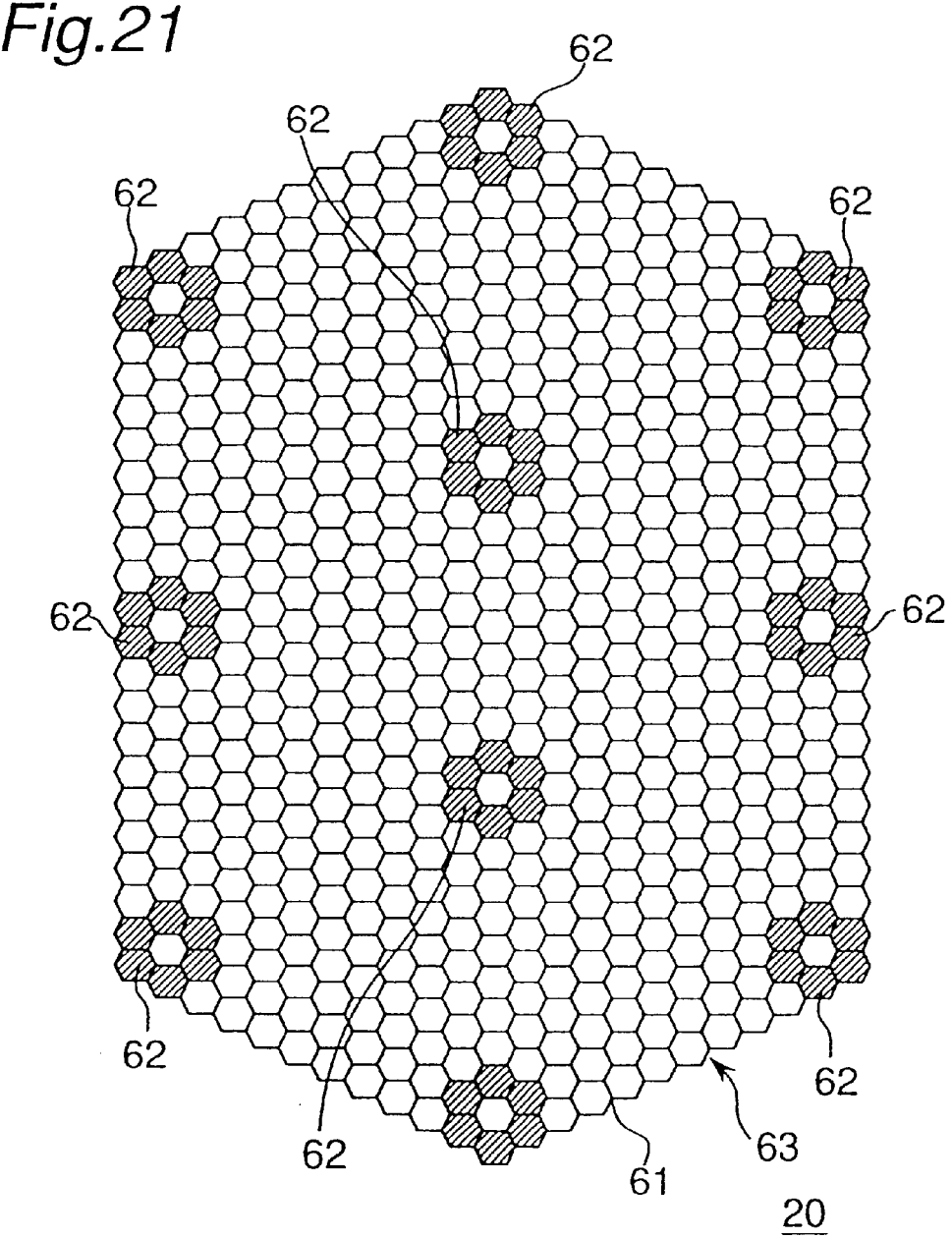
FIG. 21 is a view showing an example in which specific patterns are placed in an information recording area composed of hexagonal cells.
Figure 22:
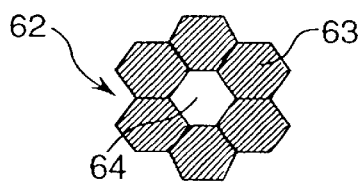
FIG. 22 shows a specific pattern placed in the information recording area of FIG. 21.

Also, FIG. 21 shows an example in which an information recording area 63 is made up with cells of hexagon on the recording surface 20, and in which specific patterns 62 are arranged at regular intervals in this information recording area 63. The specific pattern 62, as shown in FIG. 22, is composed of a central portion 64 consisting of one whitened cell of regular hexagon, and a loop portion 63 consisting of six blackened cells of regular hexagon surrounding the central portion 64. The specific pattern 62 forms a block containing seven cells as a whole. Reference Numeral 61 denotes cells representing the recorded information.

(5) Mapping of Recording-object Information

With the digital information recording carrier shown in FIG. 1 taken as an example, the way of mapping recording-object information (i.e., information to be recorded) to the information recording area 23 is now explained in conjunction with the placement of the specific patterns 22.

In the digital information recording carrier of FIG. 1, the information recording area 23 is provided with transverse 35 x longitudinal 50=1750 cells that are virtually set. Within the information recording area 23, twelve (transverse 3 x longitudinal 4) specific patterns 22, 22, . . . are placed at a pitch corresponding to 15 cells in both transverse and longitudinal directions. As described before, of all the specific patterns 22, ten specific patterns 22 belonging to the top and bottom rows and the right and left columns are placed along the perimeter of the information recording area 23, and the remaining two specific patterns 22 are placed inside (near the center) of the information recording area 23 apart from its perimeter. In particular, the specific patterns 22 located at the four corners of their arrangement are placed at the four corners of the information recording area 23. Each specific pattern 22 is composed of 25 (transverse 5 x longitudinal 5) cells, so that 300 cells are used for the specific patterns out of the 1750 cells of the entire information recording area 23. Therefore, of the remaining 1450 cells 21 are used to represent the recording-object information, permitting 1450-bit information ($2^{1450}$ pieces of information) to be represented.

Figure 24:
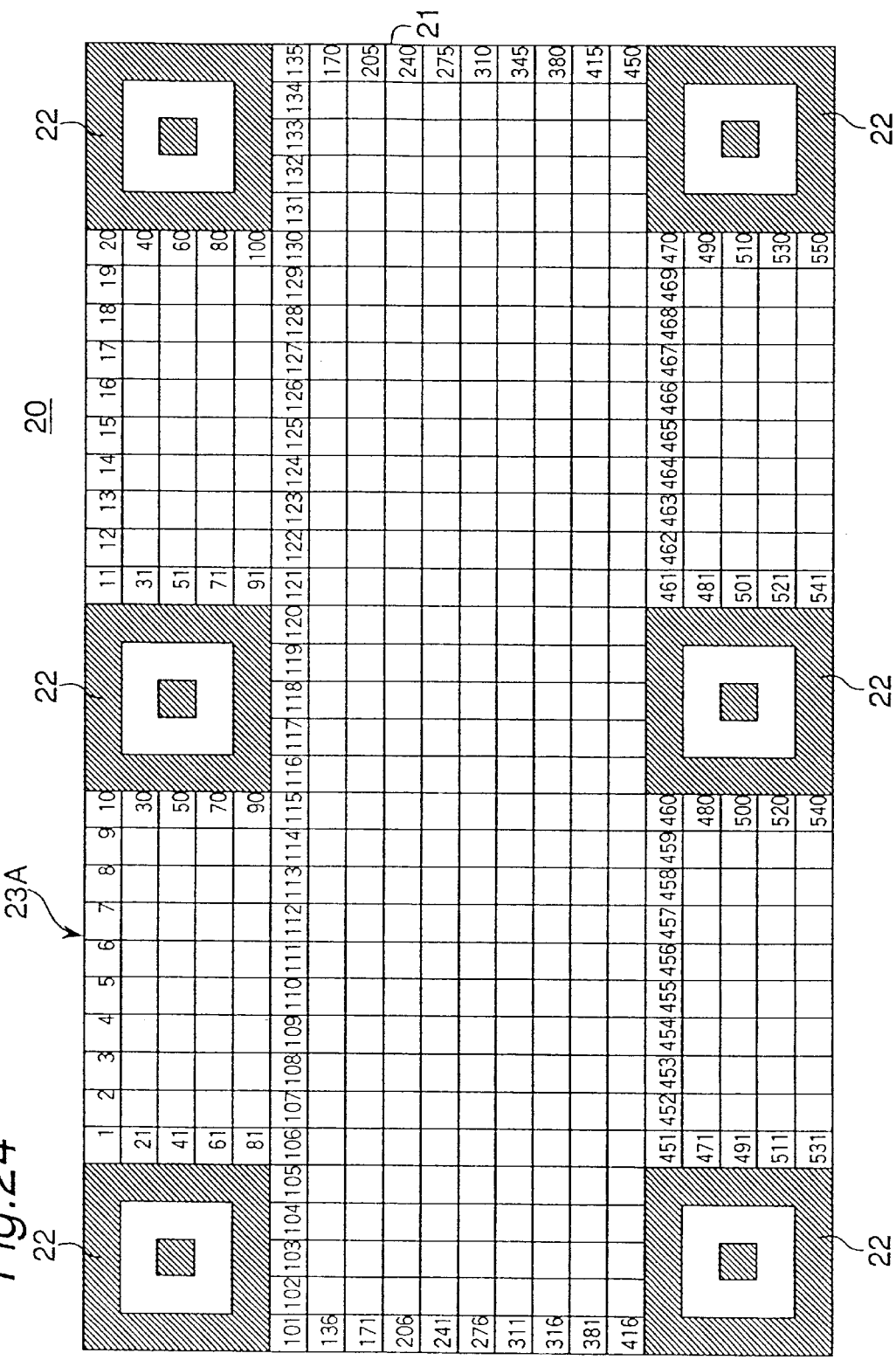
FIG. 24 is a view for explaining a mapping way in which the recording-object bit information is assigned to the cells in regions of the information recording area other than the regions where the specific patterns are placed.

FIG. 24 shows a portion 23A of transverse 35 x longitudinal 20 cells corresponding to part (an upper part) of the information recording area 23 shown in FIG. 1. In this information recording area 23A, six (transverse 3 x longitudinal 2) specific patterns 22 are placed every 15 transverse cells and every 15 longitudinal cells. Out of 700 cells of the information recording area 23A, 150 cells are used for the specific patterns 22, and the remaining 550 cells 21 are used to represent the recording-object information. The cells 21 representing the recording-object information are given addresses 1, 2, . . . , 550 (only partly shown for simplicity). Those addresses are numbered in such a manner that the first row is addressed 1 to 10, starting with a leftmost cell of the first row next to the upper left corner specific pattern 22, and increasing rightward of that cell, and further beyond the specific pattern 22 in the middle of the top row, similarly addressed 11 to 20. The second to fifth rows are addressed in the same manner, until a cell of the fifth row adjacent to the rightmost specific pattern is addressed 100. The sixth to fifteenth rows are numbered so that the address increases one by one rightward from the leftmost cell of each row. The sixteenth to twentieth rows are numbered in the same manner as the first to fifth rows with the middle specific pattern 22 jumped over. In this way, when a specific pattern 22 is placed at the middle of a row, the addressing is done with the specific pattern 22 jumped over. The first bit information of the recording-object information corresponds to the cell of address 1, where if the value of the bit information is a one ("1"), the cell is blackened; if it is a zero ("0"), the cell is whitened. From this on, recording-object information is recorded likewise, whereby the digital information of 550 bits can be mapped to 550 cells 21 of the information recording area 23A.

Although the bit information is arrayed from left to right for each row in the example of FIG. 24, the way of mapping bit information to the cells 21 is not restricted to this example.

(6) Construction and Basic Operation of Digital Information Recording Apparatus

Figure 23:
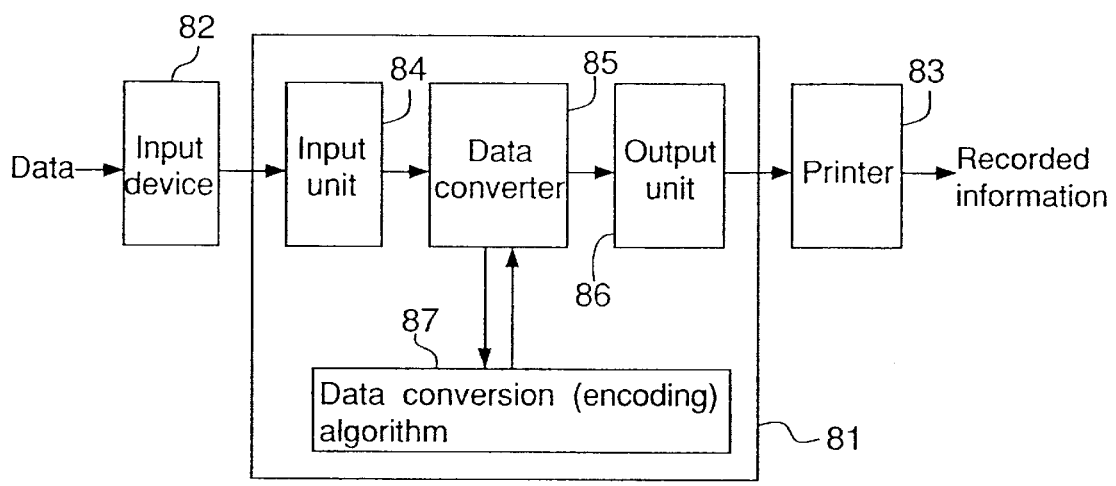
FIG. 23 is a block diagram showing the construction of a digital information recording apparatus according to one embodiment of the present invention.

FIG. 23 outlines the construction of a digital information recording apparatus according to an embodiment of the present invention. This apparatus has an input device 82, a pattern generator 81, and a printer 83. The input device 82 is constructed by a keyboard, data base, etc., and can read various types of data. The pattern generator 81 has an input unit 84, a data converter 85, an output unit 86, and a data conversion (encoding) algorithm 87. The input unit 84 receives input data from the input device 82, and transfers it to the data converter 85. The data converter 85 converts the input information received from the input unit 84 according to the data conversion (encoding) algorithm 87, as described later, and transfers the conversion result to the output unit 86 as output information.

The output unit 86 sends the output information received from the data converter 85 to the printing device 83. It is noted that the output information sent to the printing device 83 is, in general, bit image. The printing device 83 is exemplified by a dot printer, laser printer, or the like, and selected depending on the required printing precision.

Figure 25:
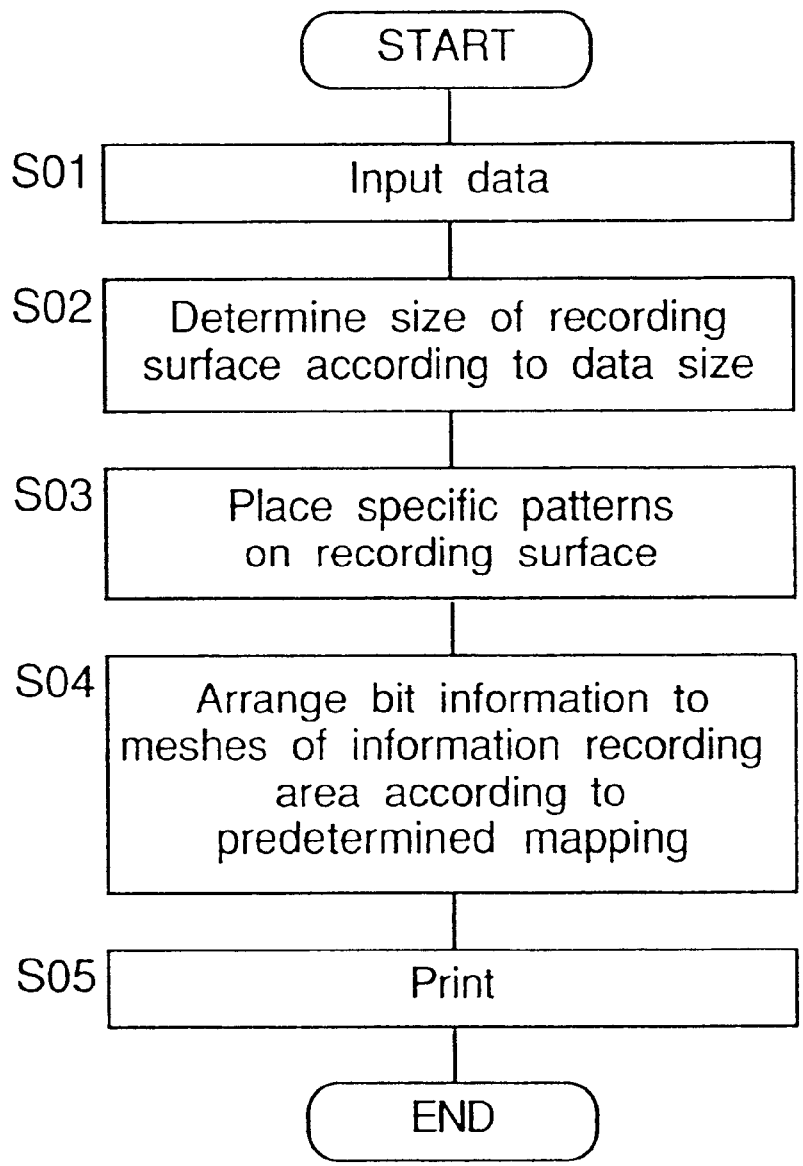
FIG. 25 is a flow chart of the processing for carrying out a digital information recording method according to one embodiment of the present invention.

This information recording apparatus records various types of data to be recorded, onto a recording surface 20 of a recording carrier, according to the flow shown in FIG. 25.

First, the input device 82 reads various types of data (S01), and sends the read data to the input unit 84 of the pattern generator 81.

In the pattern generator 81, the data converter 85 that has received the data via the input unit 84 performs the following process based on the data conversion (encoding) algorithm 87.

First, the data converter 85 determines the size of the information recording area 23 according to the size of the data (S02). The size of the information recording area 23 depends on the information to be recorded (i.e., recording-object information) and the number of specific patterns 22 to be added. In some cases, such restrictions are imposed as giving the information recording area 23 a constant transverse width or forming the information recording area 23 into a square. It is noted that the information recording area size determination process is not required if the size of the recording-object information is previously determined.

Then, the specific patterns 22 are placed at predetermined positions within the information recording area 23 (S03). For this placement, adopted is such a lattice-shaped placement that the specific patterns 22 appear, for example, every ten longitudinal cells and every fifteen transverse cells.

Bit information of data is distributed to the cells 21 for representing the recording-object information within the information recording area 23, according to a predetermined mapping (S04). This mapping is, for example, the one described before with reference to FIG. 24.

Then, the printing device 83 prints the recording-object information delivered from the output unit 86 of the pattern generator 81 onto the recording surface 20 (S05).

In this way, with this digital information recording apparatus, digital information is recorded onto the recording surface 20 of the recording carrier.

(7) Searching for Specific Patterns and Reading Information by Making Use of the Specific Patterns The method for decoding information recorded on a digital information recording carrier as shown in FIG. 1 is now explained.

Figure 26:
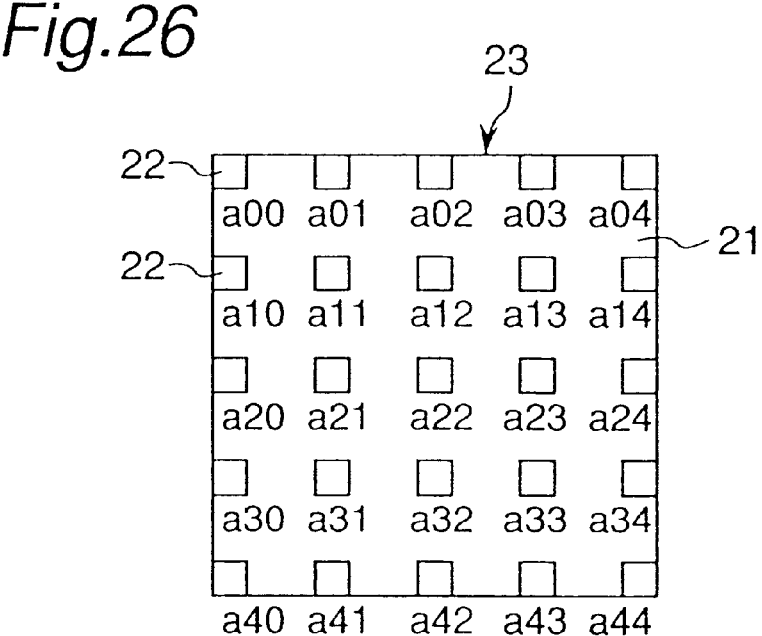
FIG. 26 illustrates bit-mapped data obtained by reading a digital information recording carrier of one embodiment with a reading device.

Recorded information is read by the reading device and, as shown in FIG. 26, bit-mapped data composed of white and black pixels corresponding to the recorded information is obtained. In FIG. 26, components corresponding to those on the recording surface 20 of FIG. 1 are designated by the same reference numerals for simplicity, and numbers of a00 to a44 are further used to discriminate the individual specific patterns 22 from each other. It is assumed that the decoding is effected to this bit-mapped data.

(i) First, search for specific patterns is carried out in the following way:

A rectangular region corresponding to the information recording area 23 is discriminated out of the bit-mapped data and its four corners are checked. In this example, the specific patterns a00, a04, a40, and a44 are placed at the four corners, and therefore the four-corner specific patterns a00, a04, a40, and a44 are detected.

It is previously known that each specific pattern 22 is a specific pattern 22B shown in FIG. 7 and composed of five (transverse) by five (longitudinal) cells. Therefore, an approximate size of the cell virtually set to the information recording area 23 becomes available by analyzing the four-corner specific patterns a00, a04, a40, and a44.

Subsequently, the specific patterns 22 placed along the four sides of the information recording area 23 are searched for. Taking an example of the specific patterns 22 placed along the upper side of the information recording area 23, a search for the specific pattern a01 next to the specific pattern a00 of the top left corner is first made, followed by searches for a02, a03 in the rightward direction one by one. For example, in searching for the specific pattern a01, since it is known that specific patterns will appear at a pitch of 15 transverse cells within the information recording area 23, the specific pattern a01 is predicted to appear at a position advanced by 15 cells from a00 toward a04. Thus, by looking into the neighborhood of the predicted position, a pattern coincident with the specific pattern 22 is searched for. By repeating this operation, the specific patterns 22 placed along the upper side of the information recording area 23 are found out one after another. In the same way, the specific patterns 22 placed along the other three sides of the information recording area 23 are found out one after another.

The specific patterns a11 to a13, a21 to a23, and a31 to a33 other than the specific patterns along on the four sides of the information recording area 23 are placed in proximity to the center of the area 23. These specific patterns are found through the steps of predicting their positions by taking advantage of the fact that the specific patterns are arranged in a lattice shape in the information recording area 23, and then looking into the proximity to the predicted positions to search for patterns coincident with the specific pattern.

In this connection, the following two search methods are available as the method of searching for the specific patterns a11 to a13, a21 to a23, and a31 to a33 positioned in proximity to the center.

Figure 27:
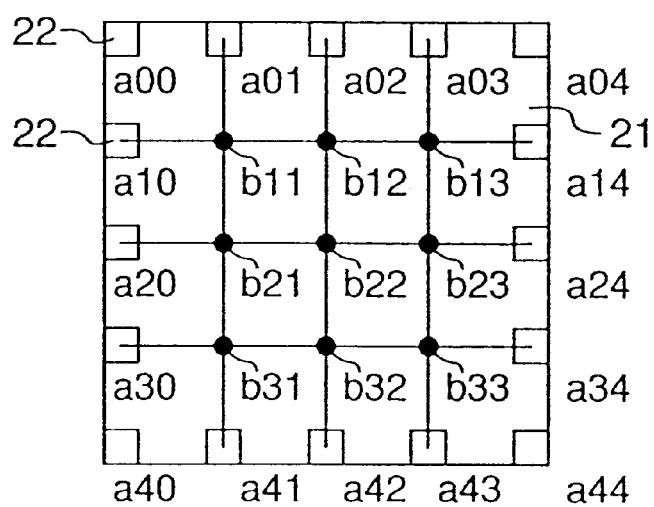
FIG. 27 is a view for explaining a first search method for searching for specific patterns in the vicinity of the center of the information recording area, based on the positions of the specific patterns placed along the perimeter of the information recording area.

The first search method determines intersecting points between lines that connect right and left corresponding specific patterns 22 to each other and lines that connect top and bottom specific patterns 22 to each other, as shown in FIG. 27, and searches for the specific patterns 22 based on the positions of the intersecting points. In more detail, the specific patterns a10, a20, a30 placed along the left side are connected with the corresponding specific patterns a14, a24, a34 placed along the right side by a straight line, and also, the specific patterns a01, a02, a03 placed along the top side are connected with the corresponding specific patterns a41, a42, a43 placed along the bottom side by a straight line. Then, the resulting intersecting points b11 to b13, b21 to b23, and b31 to b33 are determined. It is predicted that the specific patterns a11 to a13, a21 to a23, and a31 to a33 will appear in proximity to the intersecting points b11 to b13, b21 to b23, and b31 to b33, respectively. Thus, patterns coincident with the specific pattern 22 are searched for by looking into the proximities to the predicted positions. For example, for a search for a specific pattern a12, an intersection b12 between the line that connects a10 and a14 to each other and the line that connects a02 and a42 to each other is set as the predicted position. Then, by looking into the proximity to the position, the specific pattern a12 is searched for.

Figure 28:
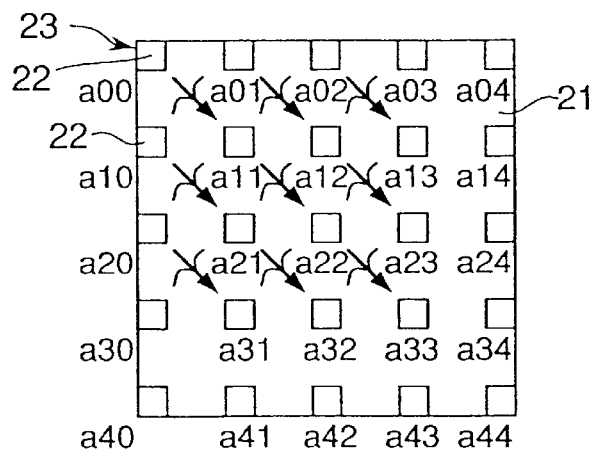
FIG. 28 is a view for explaining a second search method for searching for specific patterns in the vicinity of the center of the information recording area, based on the positions of the specific patterns placed along the perimeter of the information recording area.
Figure 29:
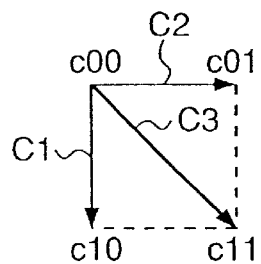
FIG. 29 is a view for explaining the way of determining coordinates of a point constituting a parallelogram through vector synthesis using the known coordinates of the remaining three points constituting the parallelogram.

The second search method, as shown in FIG. 28, is a method in which, by using three known adjacent specific patterns 22, the position of a nearby specific pattern 22 is predicted. In general, as shown in FIG. 29, if coordinates of three points c00, c01, c10 are known, then coordinates of the remaining one point c11 that constitutes a parallelogram with the three known points can be determined from the known coordinates of the three points c00, c01, c10 by using vector synthesis (the synthesis of a vector C1 (c00→c10) and another vector C2 (c00→C01) is equal to a vector C3 (c00→c11)). Therefore, the position of the specific pattern a11 is predicted by using the known coordinates of the specific patterns a00, a01, a10, and a pattern coincident with the specific pattern is searched for by looking into the proximity to the predicted position. Then, a search for the specific pattern a12 is made by using the newly obtained coordinates of the specific pattern a11 and the coordinates of the specific patterns a01 and a02. In this way, the specific patterns a11 to a13, a21 to a23, and a31 to a33 in proximity to the center of the information recording area 23 are found out sequentially.

A distortion of the recording surface 20 continuously varies within the recording surface 20 as shown in FIG. 3B. Accordingly, with respect to the predicted positions, the second search method, in which the positions of a nearby specific pattern is determined by using positional information on adjacent specific patterns 22, could be considered higher in precision than the first search method, in which an overall search for specific patterns is made. However, in the second search method, once the position of a specific pattern is misdetermined, the error would be reflected on calculation of the predicted position of the next adjacent specific pattern. Conversely, the first search method is free from such problems. Therefore, it is difficult to say which of the search methods is more preferable and advantageous.

Figure 30:
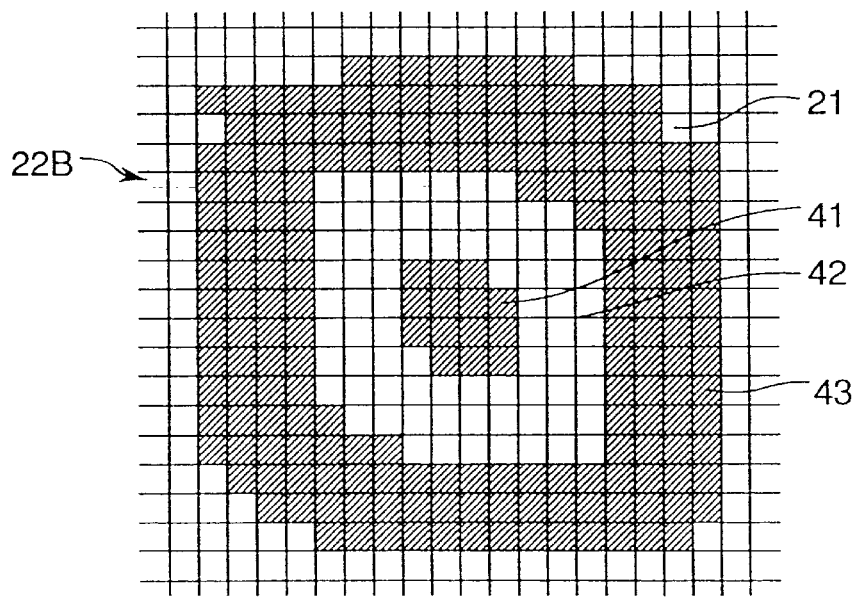
FIG. 30 illustrates bit-mapped data obtained by reading the specific pattern of FIG. 7 with a reading device.

(ii) Next, the position (positional information) of a found specific pattern 22 is determined in the following way:

FIG. 30 illustrates bit-mapped data obtained by reading a specific pattern 22B shown in FIG. 7. The position of this specific pattern 22B can be represented by the position of the central portion 41, and the position of the central portion 41 is desirably represented by the position of its center of gravity.

The position of the center of gravity of the central portion 41 in the bit-mapped data of FIG. 30 is determined by examining the positions of all the black bits that constitute the central portion 41 and then averaging the positions of the black dots. When the averaging technique is used to determine the position of the center of gravity, the more the number of samples to be used for the averaging, the higher the precision in determining the correct position of the center of gravity. Since the specific pattern 22B is symmetrical with respect to a vertical and horizontal directions, the position of the center of gravity of the first loop portion 42 is supposed to be also coincident with the position of the center of gravity of the central portion 41. Therefore, in the bit-mapped data of FIG. 30, by averaging the positions of all the black bits that constitute the central portion 41 and also by averaging the positions of all the white bits that constitute the first loop portion 42, the position of the center of gravity of the central portion 41 is determined with high precision. In addition, it might also be possible to further use the information on the second loop portion 43. However, using the information on the second loop portion 43 is not so practical because it is difficult to recognize the boundary between the cells of the second loop portion 43 and cells 21 representing the recorded information when the values of the cells representing the recorded information immediately adjacent to the outer edge of the second loop portion 43 are black.

Also for the specific pattern 22A shown in FIG. 6, the position of its center of gravity can be determined by averaging the positions of all the white bits that constitute the central closed area 44. However, note that the position of the center of gravity represents the position of the center of the four cells that constitute the central closed area 44, and is not a point that represents any one of the cells.

Figure 31:
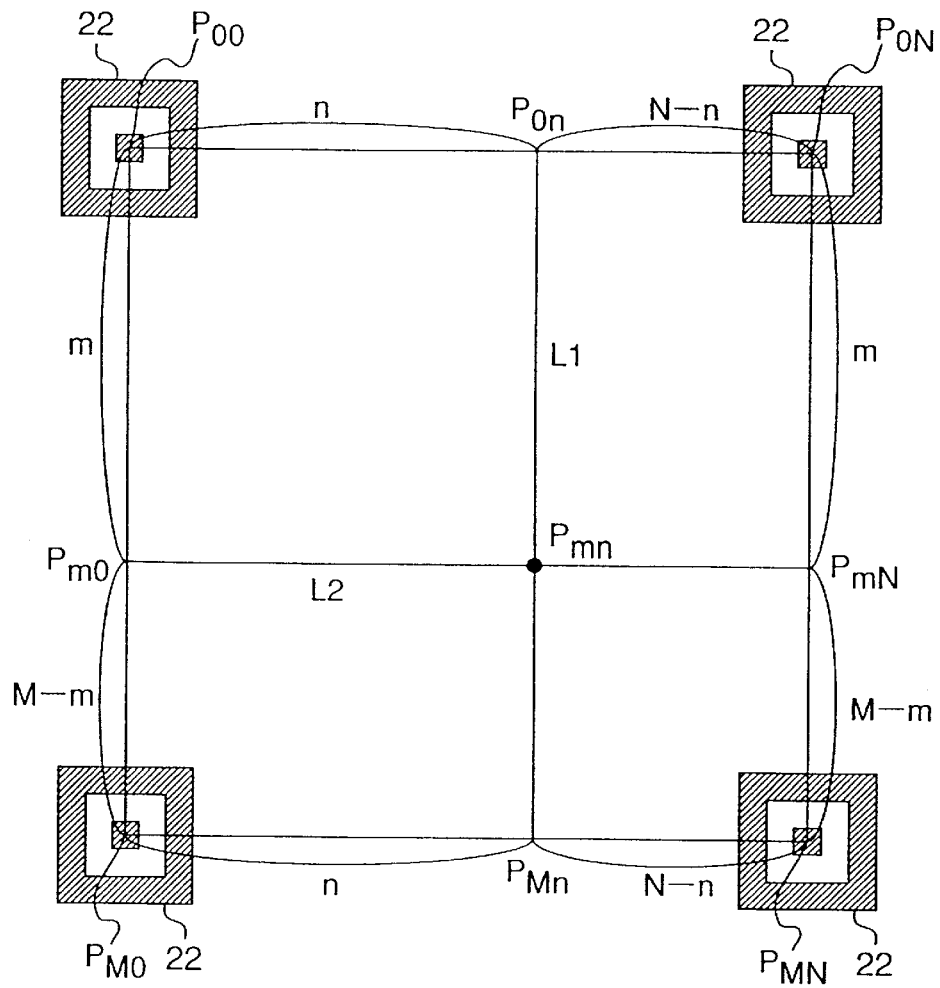
FIG. 31 is a view for explaining the way of calculating the positions of arbitrary cells within the information recording area, based on the positions of four specific patterns.

(iii) Next, the values of the cells 21 representing the recorded information are obtained:

The method therefor is explained with reference to FIG. 31. FIG. 31 schematically shows a region in the information recording area 23, the region containing four adjacent specific patterns 22 (a region containing cells of M rows by N columns). Even if an irregular distortion as shown in FIG. 3B has occurred over the whole recording surface 20, the distortion occurring to such a small region surrounded by four adjacent specific patterns can be approximated to an almost proportional distortion.

Referring to FIG. 31, assume that the position of the upper left (row 0, column 0) specific pattern 22 is $P_{00}$, the position of the upper right (row 0, column N) specific pattern 22 is $P_{0N}$, the position of the lower left (row M, column 0) specific pattern 22 is $P_{M0}$, and the position of the lower right (row M, column N) is $P_{MN}$, and that the position of a cell of the mth row and the nth column (where m, n are arbitrary integers) in the region surrounded by these four specific patterns 22 is $P_{mn}$.

If a point that internally divides a line segment connecting $P_{00}$ and $P_{0N}$ at a ratio of n:(N-n) is $P_{0n}$, if a point that internally divides a line segment connecting $P_{M0}$ and $P_{MN}$ at a ratio of n:(N-n) is $P_{Mn}$, if a point that internally divides a line segment connecting $P_{00}$ and $P_{M0}$ at a ratio of m:(M-m) is $P_{m0}$, and if a point that internally divides a line segment connecting $P_{0N}$ and $P_{MN}$ at a ratio of m:(M-m) is $P_{mN}$, then the position of the cell $P_{mn}$ to be determined can be expressed as the intersecting point between a line L1 connecting $P_{0n}$ and $P_{Mn}$ and another line L2 connecting $P_{m0}$ and $P_{mN}$. The intersecting point $P_{mn}$ of the lines L1 and L2 is expressed also as a point that internally divides the line L1 at a ratio of m:(M-m) or a point that internally divides the line L2 at a ratio of n:(N-n). By using the positions $P_{00}$, $P_{0N}$, $P_{M0}$, $P_{MN}$ of the four specific patterns 22, the position $P_{mn}$ of a cell within the region surrounded by these four specific patterns 22 is expressed as:

$$P_{mn} = \frac{(M-m)(N-n)P_{00} + (M-m)n \cdot P_{0N} + m(N-n)P_{M0} + m \cdot n \cdot P_{MN}}{M \cdot N} \quad (1)$$

Figure 32:
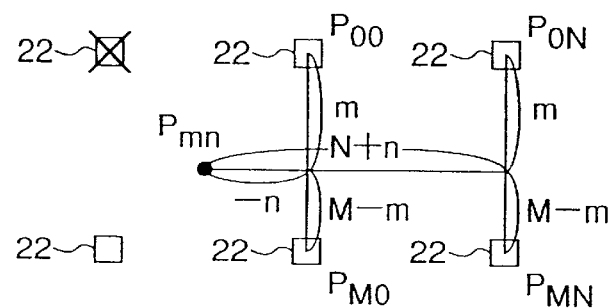
FIG. 32 is a view for explaining a modification example of the way of calculating the positions of arbitrary cells within the information recording area, based on the positions of four specific patterns.

In addition, from the viewpoint of determining the position $P_{mn}$ of a cell representing recorded information by a proportional division method using the positions $P_{00}$, $P_{0N}$, $P_{M0}$, $P_{MN}$ of the four adjacent specific patterns 22, it is also possible to use the points that externally divide the individual line segments, instead of the points that internally divide the line segments. Therefore, as shown in FIG. 32, even if either one (marked by x) of the four specific patterns surrounding the target cell $P_{mn}$ cannot be found, it is possible to determine the position $P_{mn}$ of the target cell by a proportional division (external division) method by using, for example, a set of another four specific patterns 22 on the immediately right side.

Figure 33:
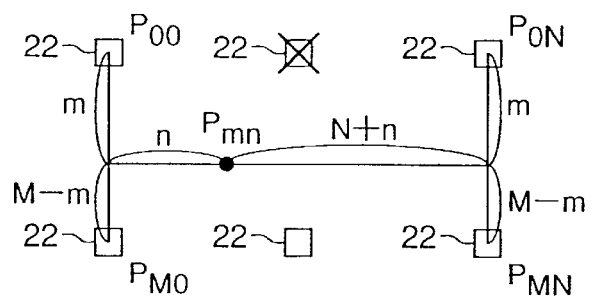
FIG. 33 is a view for explaining a further modification example of the way of calculating the positions of arbitrary cells within the information recording area, based on the positions of four specific patterns.

Also, the four specific patterns 22 do not necessarily need to be adjacent ones. As shown in FIG. 33, if either one (marked x) of the adjacent four specific patterns is not found, similar proportional divisional process is achieved even by using, for example, a set of four specific patterns 22, which are adjacent to each other in the longitudinal direction but are not adjacent in the transverse direction.

Further, this method of determining the position of an arbitrary cell from four specific patterns is applied to not only cases where the information recording area is rectangular, but also cases where it is, for example, a parallelogram (FIG. 20).

In this way, by determining the position $P_{mn}$ of the target cell, the value of the position-determined cell can be obtained.

Figure 34:
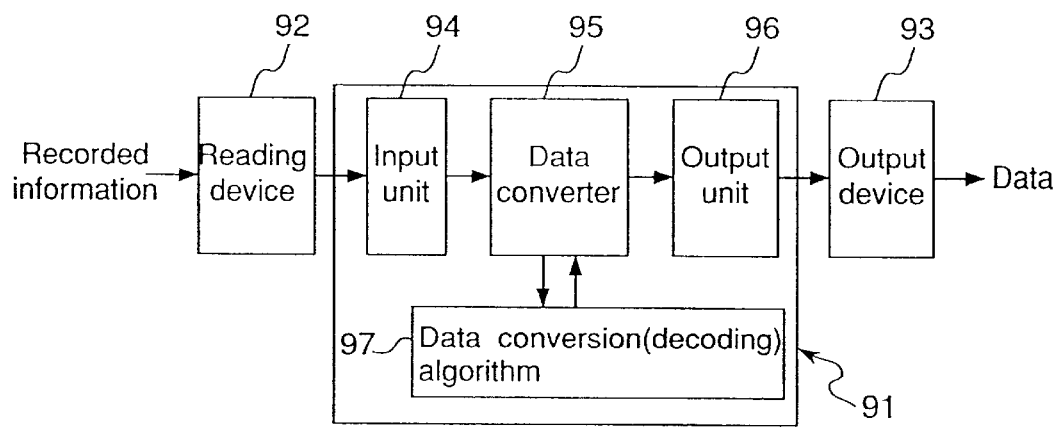
FIG. 34 is a block diagram showing the construction of a digital information decoding apparatus according to one embodiment of the present invention.

(8) Construction and Basic Operation of the Digital Information Decoding Apparatus FIG. 34 outlines the construction of a digital information decoding apparatus according to an embodiment of the present invention. This apparatus has a reading device 92, an information decoder 91, and an output device 93. The reading device 92 is exemplified by an image scanner, CCD (Charge-Coupled Device) camera, or the like, and an appropriate type is selected depending on the required reading precision. The reading device 92 reads recorded information printed on the recording surface 20 such as paper.

The information decoder 91 has an input unit 94, a data converter 95, an output unit 96, and a data conversion (decoding) algorithm 97. The input unit 94 receives data from the reading device 92 as input information, and delivers it to the data converter 95. It is noted that the input information delivered from the reading device 92 to the input unit 94 is, in general, bit image. The data converter 95 decodes the input information received from the input unit 94 with the data conversion (decoding) algorithm 97, and delivers the conversion result to the output unit 96 as output information. The output unit 96 sends the output information received from the data converter 95 to the output device 93. The output device 93 is exemplified by a display, data base, etc., and displays or stores the read information.

In this arrangement, conversion performed by the data conversion (encoding) algorithm 87 of FIG. 23 and conversion performed by the data conversion (decoding) algorithm 97 of FIG. 34 are inverse to each other. Therefore, the recorded information printed on the recording surface 20 by the recording device of FIG. 23 is read by the decoding apparatus of FIG. 34, so that the same data as the original is obtained.

Figure 35:
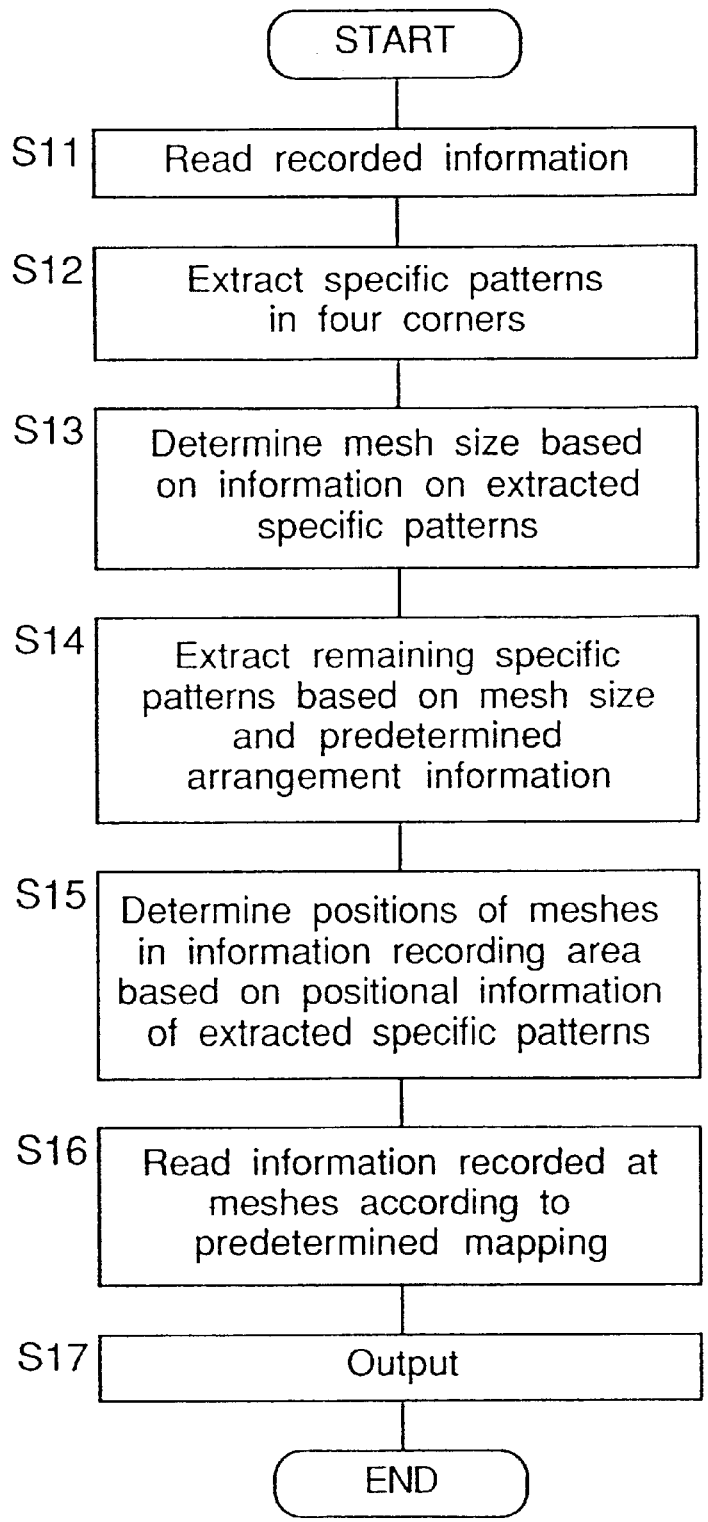
FIG. 35 is a flow chart of the processing for carrying out a digital information decoding method according to one embodiment of the present invention.

This information decoding apparatus reads information recorded on the recording surface 20 of a recording carrier, according to the flow shown in FIG. 35. It is assumed here that, as shown in FIG. 1, the specific patterns 22 are placed within the information recording area 23 in the lattice form at regular intervals and that recorded information with four specific patterns 22 placed at the four corners of the information recording area 23 will be decoded.

(i) First, the reading device 92 reads information recorded on the recording surface 20 of the recording carrier (S11), and delivers it to the input unit 94 of the information decoder 91.

(ii) In the information decoder 91, the data converter 95, which has received data via the input unit 94, performs the following processes according to the data conversion (decoding) algorithm 97:

First, the data converter 95 extracts specific patterns 22 placed at the four corners within the information recording area 23 (S12).

Next, the size of one cell is determined based on the information on the four-corner specific patterns 22 (S13).

Next, the remaining specific patterns are extracted based on predetermined placement information (S14). The predetermined placement information is information on the placement of the specific patterns 22 such as, for example, that the specific patterns are so placed into a lattice shape as to appear every ten longitudinal cells and every fifteen transverse cells.

Next, based on the information on the positions of the extracted specific patterns (positional information), the data converter 95 determines the positions of the cells representing the recorded information (S15).

Next, according to a predetermined mapping, the data converter 95 reads the information recorded at such cells 21 (S16). It is noted that the predetermined mapping refers to a correspondence between the cells 21 and the bit information such as described before with reference to FIG. 24.

(iii) Then, the output device 93 outputs the output information delivered from the output unit 96 of the information decoder 91 (S17).

In this way, with this digital information decoding apparatus, digital information recorded on the recording surface 20 of a recording carrier is decoded.

(9) Specific Patterns at the Four Corners of the Information Recording Area

In the present invention, a plurality of specific patterns 22 are placed within the information recording area 23. Among the specific patterns 22, those placed at the four corners of the information recording area 23 are of greater importance than the others.

(i) In the information decoding method, as is obvious from the processing flow of FIG. 35 (step S12), the specific patterns 22 at the four corners of the information recording area 23 are searched for preferentially to the other specific patterns. This is not only because the four-corner specific patterns are easier to find than the others, but also because finding first the four-corner specific patterns 22 makes it possible to determine the range occupied by the information recording area 23 within the recording surface 20.

That is, the presence of the specific patterns 22 at the four corners of the information recording area 23 allows the range occupied by the information recording area 23 within the information recording area 23 to be easily recognized (that is, what is called, cut out) during a read operation. For example, referring to the example of FIG. 1, even if the cells constituting the information recording area 23 are all white, the presence of the specific patterns 22 at the four corners allows the range occupied by the information recording area 23 to be easily determined. It is also true when the cells constituting the information recording area 23 are all black. It is noted that cases where the specific pattern is composed of white cells only are not considered. Oppositely, with the specific patterns 22 absent at the four corners of the information recording area 23, it would be impossible to discriminate whites within the information recording area 23 from whites outside the information recording area 23. This is because the cells placed along the perimeter of the information recording area 23 are sometimes all whitened.

Figure 37:
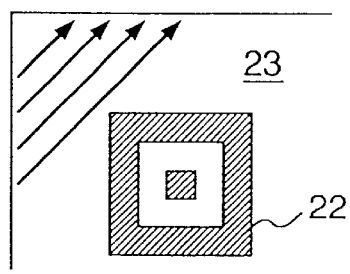
FIG. 37 is an explanatory view showing a way of searching for the specific patterns placed at the four corners of the information recording area.

(ii) FIG. 37 schematically shows the method of searching for the specific patterns 22 of the four corners of the information recording area 23 from the bit-mapped data constituting the recorded information. For a search for a specific pattern 22 placed at the top left corner, the bit-mapped data is scanned obliquely from its top left corner in skew directions (indicated by arrows in the figure). If the peripheral portion of the information recording area 23 is made up of white bits, then a black bit that is a constituent bit of the top left specific pattern 22 appears first in the skew scan. Thus, the specific pattern 22 of the top left corner is found out. It is natural that the specific patterns of the top right corner, bottom left corner, and bottom right corner in the information recording area 23 can be found similarly by the skew scanning of the bit-mapped data from the top right corner, bottom left corner, and bottom right corner, respectively.

(iii) The technique of determining the range occupied by the information recording area 23 within the recording surface 20 by adding discriminant marks to the four corners of the information recording area 23, per se, has conventionally been known. However, in the prior art, as shown in FIG. 36B, the discrimination marks 29 are placed outside the rectangular information recording area 23, so that the region between the discrimination marks 29, 29 would result in a useless one. In contrast, according to the present invention, because the specific patterns 22 are placed in the four corners of the information recording area 23 as shown in FIG. 36A, the region representing the recorded information is increased, compared with the arrangement of FIG. 36B, so that the recording surface 20 is utilized without waste.

Figure 36A:
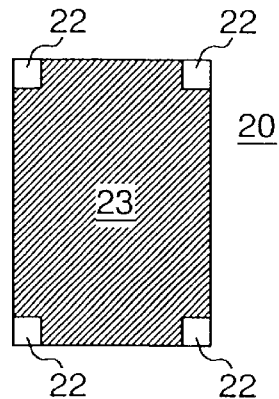
FIGS. 36A and 36B show different examples of arrangement of specific patterns to be placed at the four corners of the information recording area, wherein the specific patterns are placed inside and outside, respectively, of the information recording area.
Figure 36B:
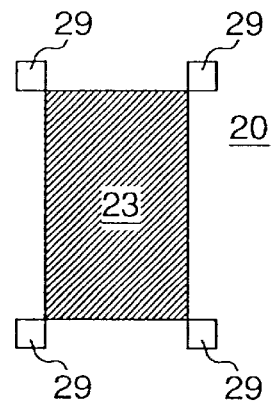

(iv) The specific pattern 22A shown in FIG. 6 or the specific pattern 22B shown in FIG. 7 is usable as the discrimination mark 22 shown in FIG. 36A.

If the discrimination mark 22 is given by the specific pattern 22A as shown in FIG. 6 or the specific pattern 22B as shown in FIG. 7, the discrimination mark will be less affected by dirt or ink blurs during printing, as described before, and also, information on the size of cells constituting the information recording area 23 and other information are easily obtained. In contrast, if the discrimination mark 22 is formed simply by a single blackened cell or by a black circle, it would be difficult to obtain information on the size of cells constituting the information recording area 23, due to the bad effects of dirt or ink blurs occurring during printing.

Figure 38:
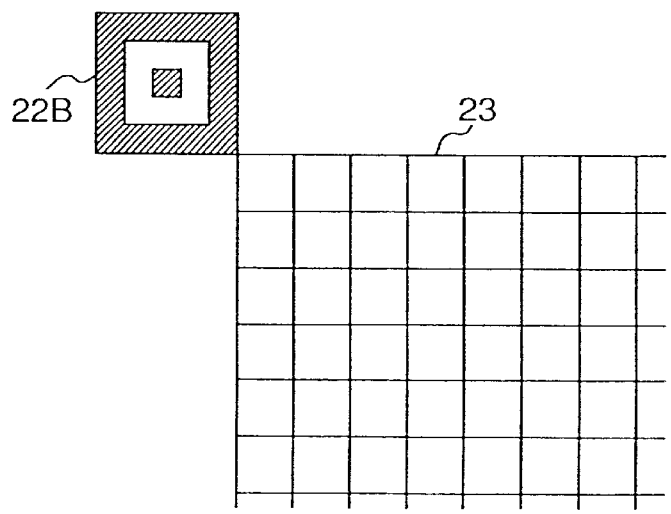
FIG. 38 shows a specific pattern placed at the top left corner of the information recording area, the specific pattern being formed from cells that are different in size from those within the information recording area.

The size and shape of the specific pattern 22A or 22B used as the discrimination mark is independent of the size and shape of cells constituting the information recording area 23 when information on the cells of the information recording area 23 does not need to be obtained. For example, as shown in FIG. 38, the size of cells constituting the specific pattern 22B used as the discrimination mark is ½ the size of cells constituting the information recording area 23.

Figure 39:
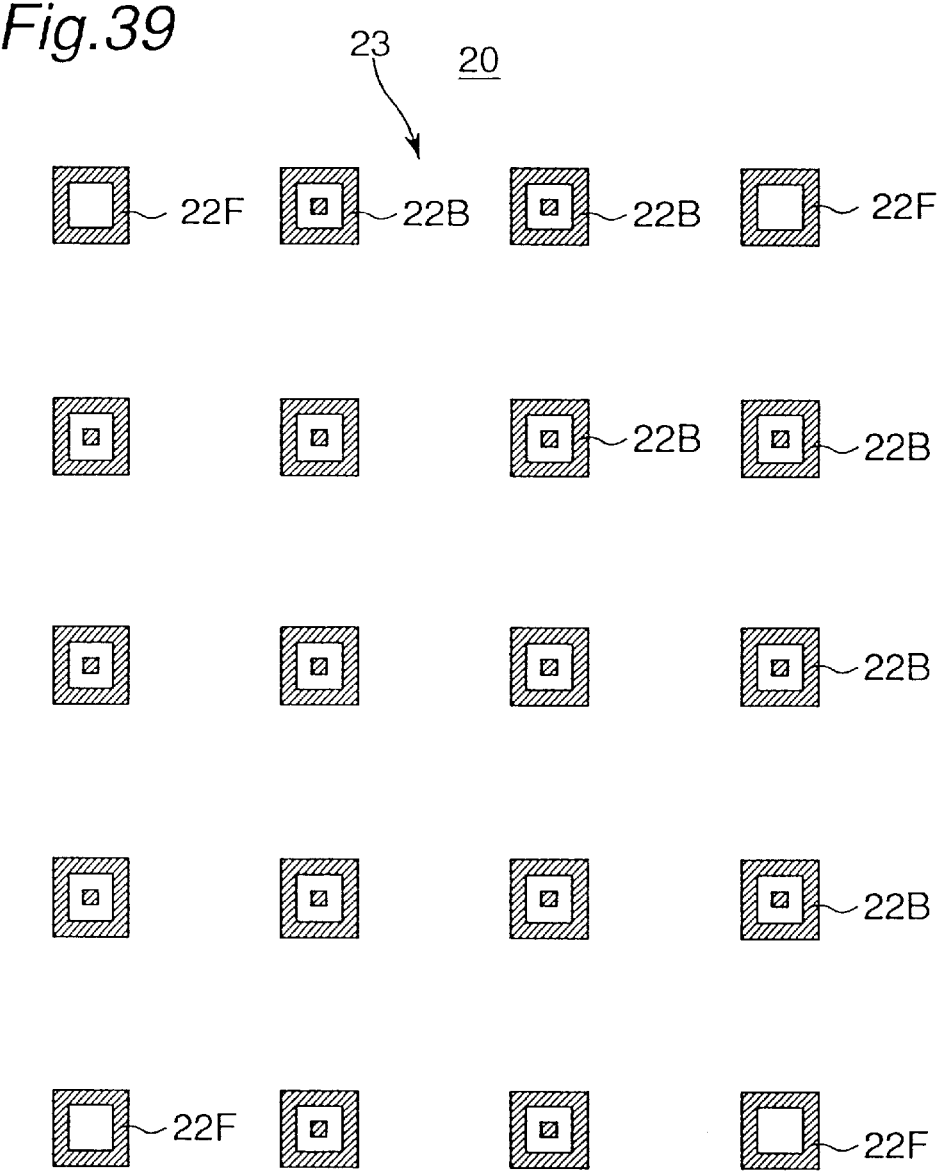
FIG. 39 shows an example in which specific patterns placed at the four corners of the information recording area are different from the other specific patterns.

(v) Also, as shown in FIG. 39, as the specific patterns for the four corners of the information recording area 23, a pattern 22F (see FIG. 8D) different from the other specific patterns 22B can be used. If the specific patterns of the four corners of the information recording area 23 are different from the other specific patterns as in this example, the four corners of the information recording area 23 is easily found by searching for the modified specific patterns (22F in this example). However, the reading device should be adapted to recognize the two different types of specific patterns 22F and 22B.

Figure 40:
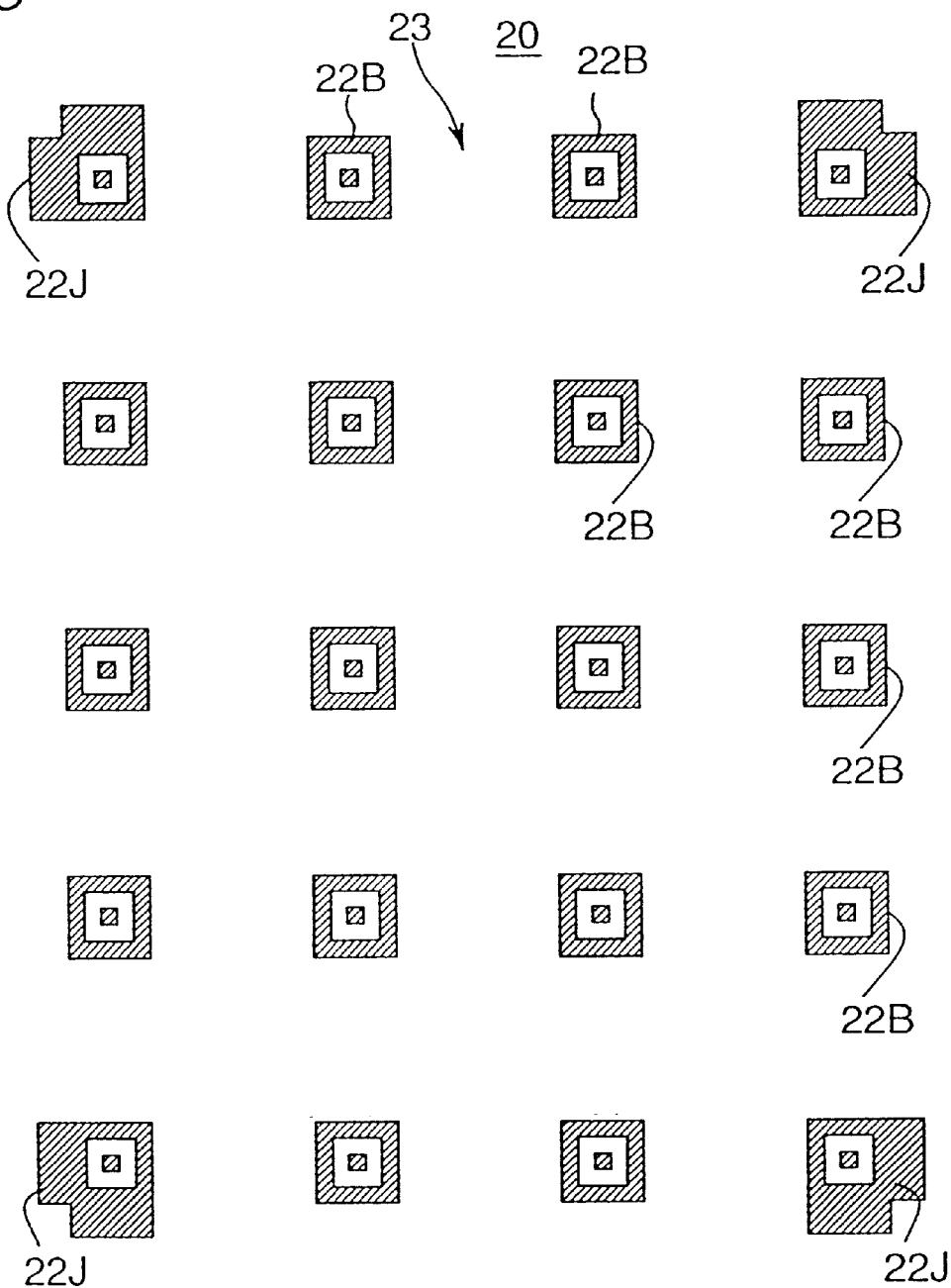
FIG. 40 shows another example in which specific patterns placed at the four corners of the information recording area are different from the other specific patterns.
Figure 41:
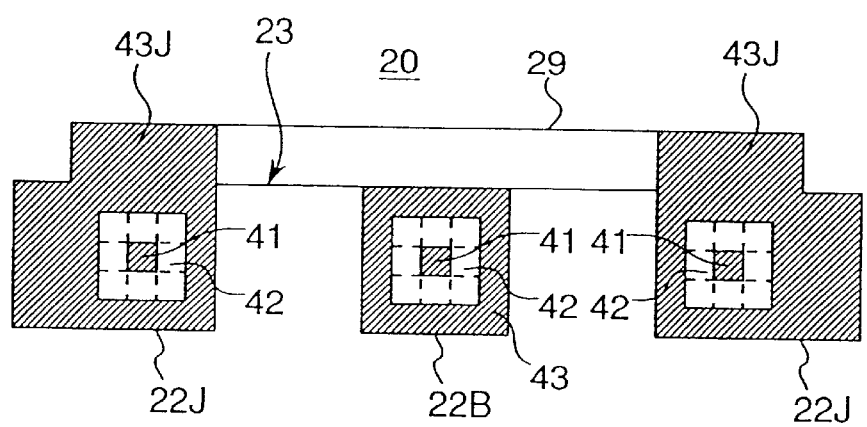
FIG. 41 is an enlarged view of an upper portion of the information recording area of FIG. 40.

(vi) Further, FIG. 40 shows another example in which the specific patterns of the four corners of the information recording area 23 are modified. In this example, as shown in FIG. 41 (which shows an enlarged upper part of the information recording area 23 of FIG. 40), a pattern 22J, which is a modification of the pattern 22B, is used as the specific pattern for the four corners. The specific pattern 22J is formed by expanding two sides of the second loop portion 43 of the specific pattern 22B outward of the information recording area 23 each to an extent of two cells. In such a case, a region between expanded portions 43J of the opposite modified specific patterns 22J, 22J results in a silent region 29 where neither the recording-object information nor the specific pattern 22B appears. Therefore, the perimeter of the information recording area 23 is easily detected by detecting this silent region 29.

The above modified specific pattern 22J can be found by using the same method as the search method for the specific pattern 22B described with reference to FIG. 16. In the processing flow of FIG. 16, the specific pattern 22B is found by looking into the central portion 41 and first loop portion 42 of the specific pattern 22B. The modified specific pattern 22J also has the same central portion 41 and first loop portion 42 as in the specific pattern 22B. This is why the search method for the specific pattern 22B is also applicable to a search for the modified specific pattern 22J.

Figure 42:
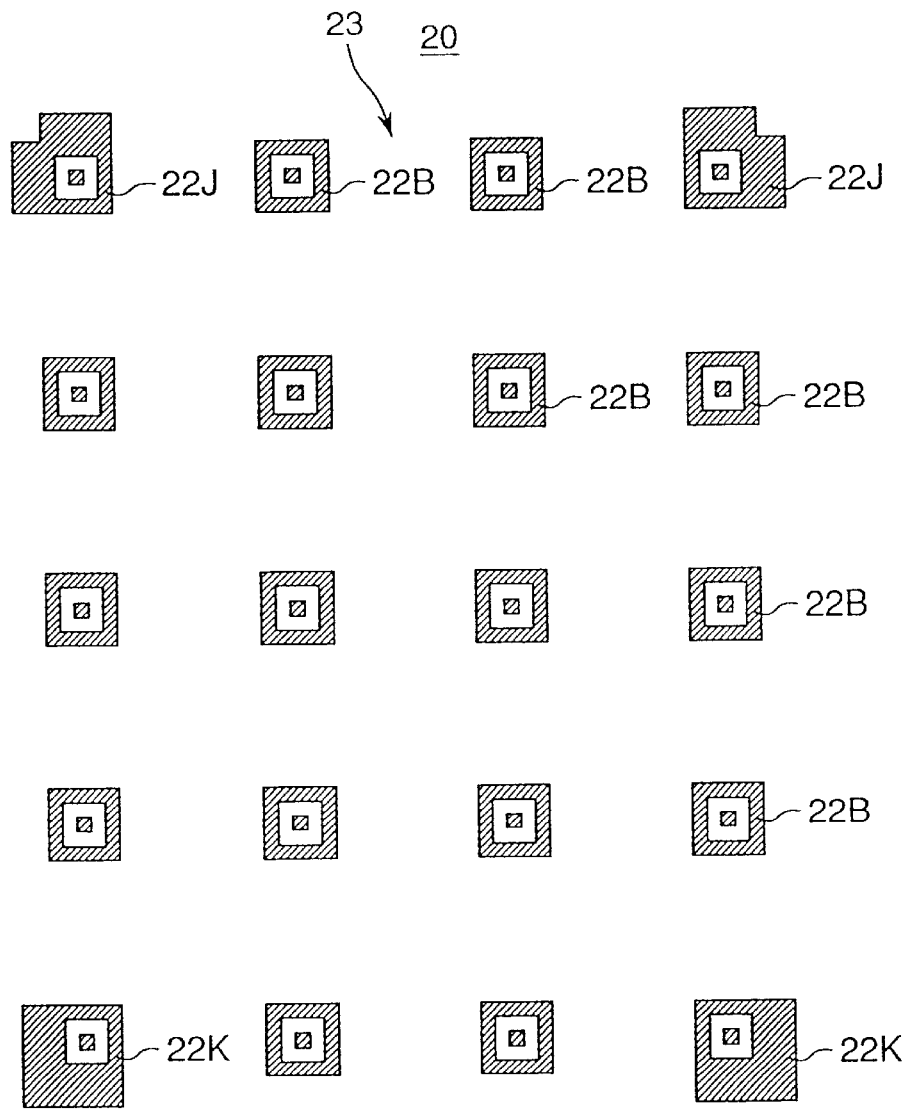
FIG. 42 is a view showing an example in which, out of the specific patterns placed at the four corners of the information recording area, the upper pair of specific patterns are made different from the lower pair of specific patterns.

(vii) In an alternative example, of the four modified specific patterns for the four corners of the information recording area 23, the upper ones are made different from the lower ones, as shown in FIG. 42. In this example, the specific patterns 22J, 22J shown in FIG. 40 are used for the top left corner and the top right corner, while specific patterns 22K, 22K are used for the bottom left corner and the bottom right corner. The specific pattern 22K for the bottom left and bottom right corners is formed by extending the expanded portions 43J (see FIG. 41) on two sides of the specific pattern 22J toward the corner of the information recording area, with the width of the expanded portion maintained. In this way, by making the modified specific patterns of the four corners of the information recording area 23 different between upper ones and lower ones, the top and bottom as well as the right and left of the recording surface 20 can be recognized.

As will be understood from the above, the top and bottom as well as the right and left of the recording surface 20 can be easily identified if part of the specific patterns placed at the four corners is made different in configuration and light/dark status from the rest of the specific patterns placed at the four corners in such a way that a set of the specific patterns for the four corners is asymmetrical with respect to a 90°, 180°, or 270° rotation within the plane of the recording surface 20. In an example, out of the specific patterns placed at the four corners, two specific patterns placed at the left side differ in configuration or light/dark status from the other two specific patterns placed at the right side. In another example, one of the specific patterns placed at the four corners differs in configuration or light/dark status from the remaining three specific patterns.

Figure 43:
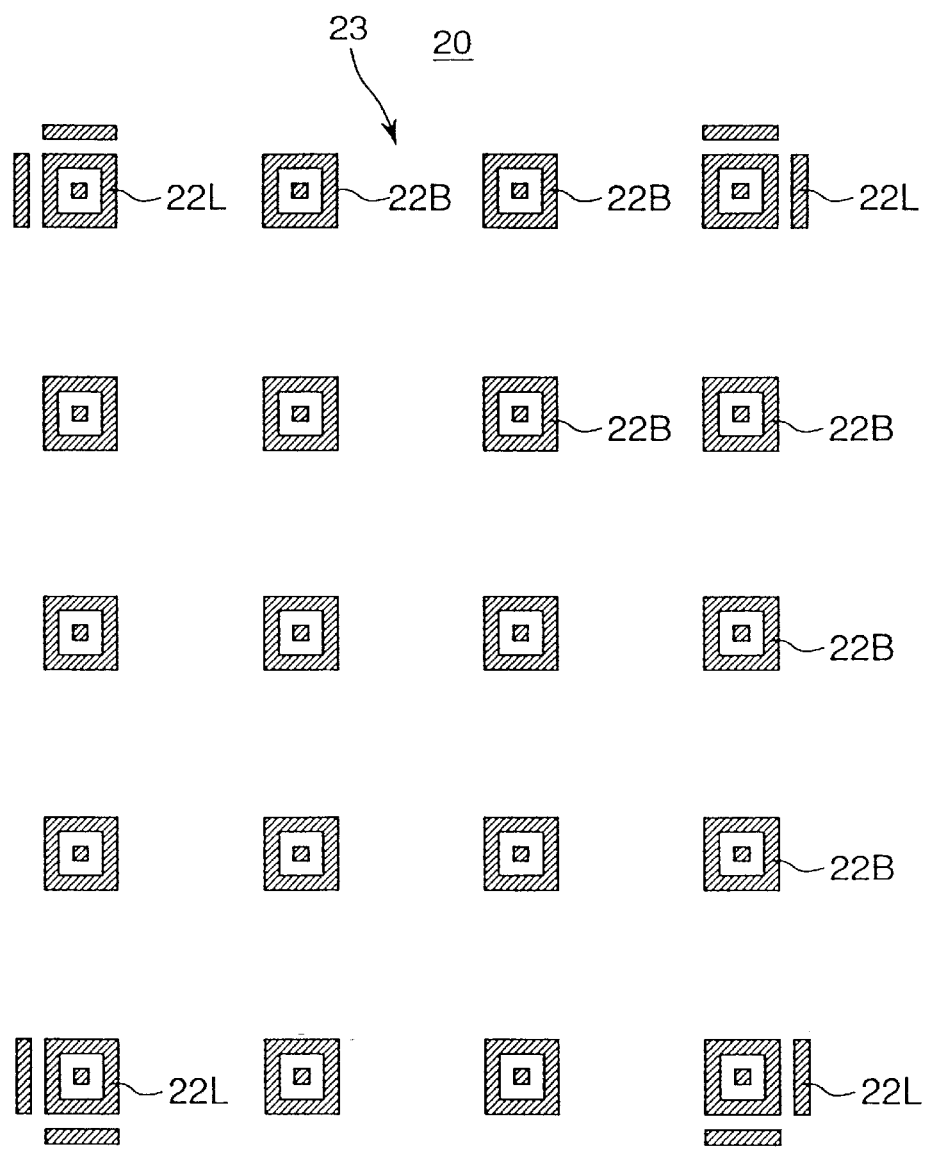
FIG. 43 is a view showing another example in which the specific patterns placed at the four corners of the information recording area are made different from the other specific patterns.
Figure 45:
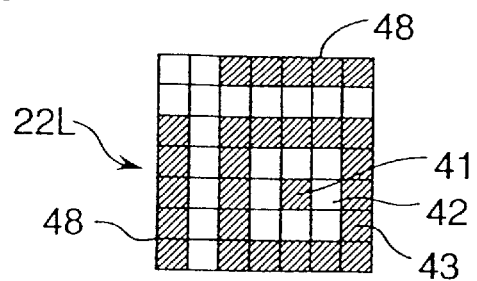
FIG. 45 is an enlarged view of the specific pattern placed at the top left corner of the information recording area in FIGS. 43 and 44.

(viii) Further, a pattern 22L shown in FIG. 43 is also adoptable as the modified specific pattern for the four corners of the information recording area 23. The modified specific pattern 22L is formed by adding an additional black portion to a fundamental pattern portion (which has, for example, a configuration identical to the specific pattern 22B) in a manner that the additional black portion is spaced from the fundamental portion. The modified specific pattern 22L so constructed has, as shown in FIG. 45, a central portion 41, a first loop portion 42 and a second loop portion 43 as in the specific pattern 22B, and further has two black bars 48, 48 each composed of linearly connected five cells. The black bars are opposite to two sides of the second loop portion 43, respectively. A white region of one cell size is provided between each black bar 48 and the opposite outer side of the second loop portion 43. This modified specific pattern 22L can be considered to be a specific pattern made up of a total of 7 x 7 cells.

Figure 44:
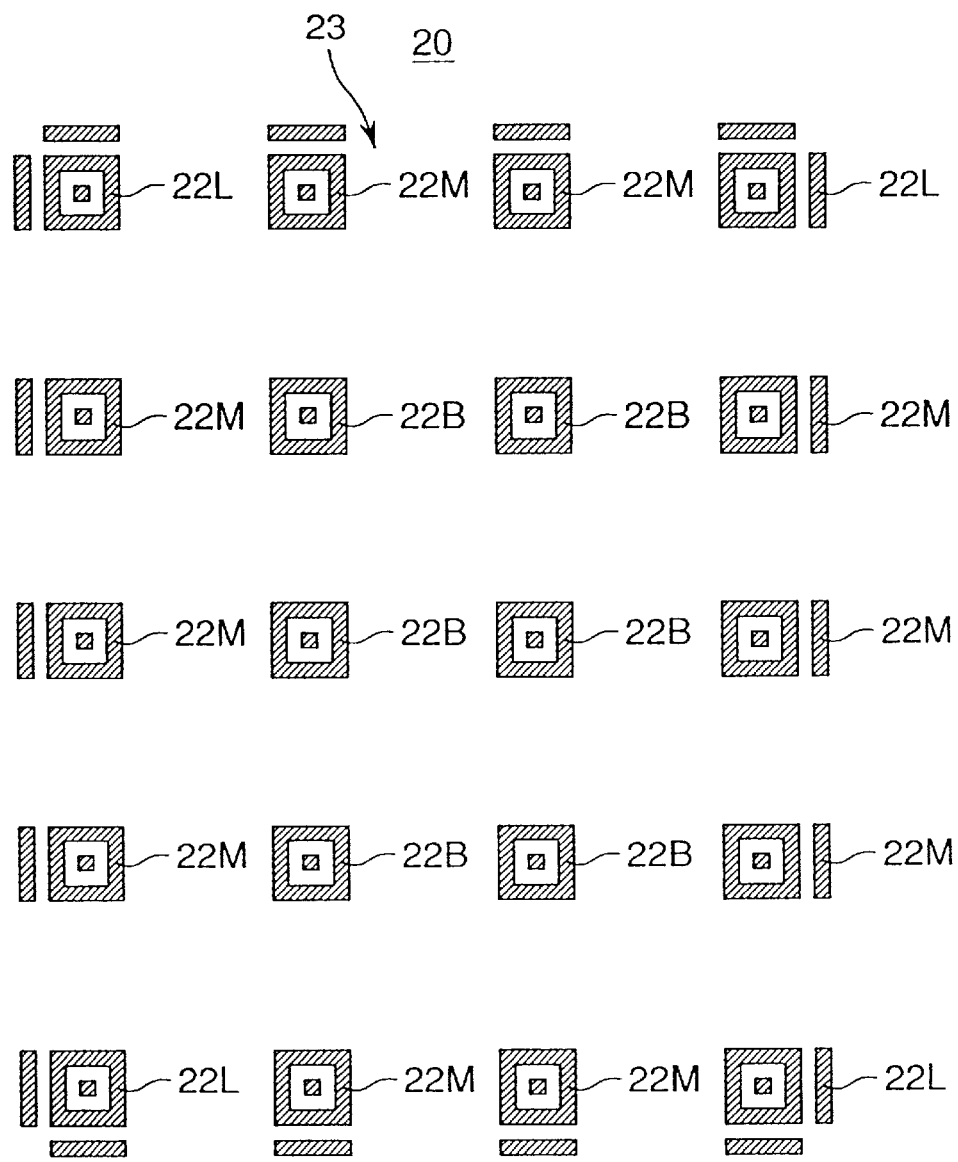
FIG. 44 is a view showing an example in which, in the example of FIG. 43, the specific patterns placed along the sides of the information recording area are further made different from the specific patterns inside the information recording area.

In a further example, a black portion is added in a spaced manner not only to the specific patterns of the four corners but to all the specific patterns placed along the perimeter of the information recording area 23, as shown in FIG. 44. In this example, of all the specific patterns placed along the perimeter of the information recording area 23, specific patterns 22M other than the specific patterns 22L of the four corners are each formed by adding a black bar composed of linearly connected five cells, to the outside of the fundamental pattern portion (whose configuration is identical to that of the specific pattern 22B), with a white region of one cell size interposed therebetween.

When a black bar portion of a modified specific pattern is provided outside of the information recording area 23, as shown in FIGS. 43 and 44, the specific patterns 22L of the four corners and the specific patterns 22M on the perimeter are easy to find.

(10) Black and White Inversion of Specific Patterns

Figure 46:
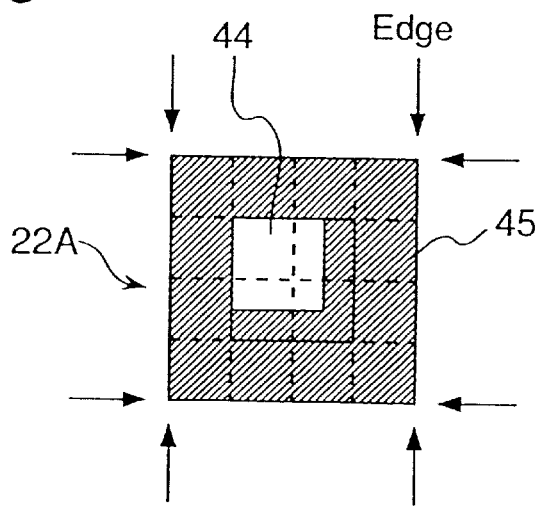
FIG. 46 shows an example of deformation of the specific pattern of FIG. 6 wherein the right and lower sides of the central closed area are blacked.

FIG. 46 illustrates an aspect in which the specific pattern 22A shown in FIG. 6 has been deformed by the effects of blurs of ink, dirt stuck to the recording carrier, and the like. In this example, whereas no deformation has occurred to the left and upper sides of the central closed area 44, the right and lower sides of the central closed area 44 have been blackened and deformed. In reading such a deformed specific pattern 22A, an attempt to determine the position of the specific pattern 22A (positional information) by using only the position of the central closed area 44 would result in erroneous position determination, wherein a position shifted toward the upper left of the original position would be determined as the position of the specific pattern 22A. Such a positional shift can be corrected by utilizing the position of the loop portion 45 of the specific pattern 22A. This is because, in the case of deformation shown in FIG. 46, the loop portion 45 is thicker on the right and lower sides more than on the left and upper sides, and therefore the positional shift of the loop portion 45 tends to be directed to the lower right, conversely to the positional shift of the central closed area 44.

Figure 47:
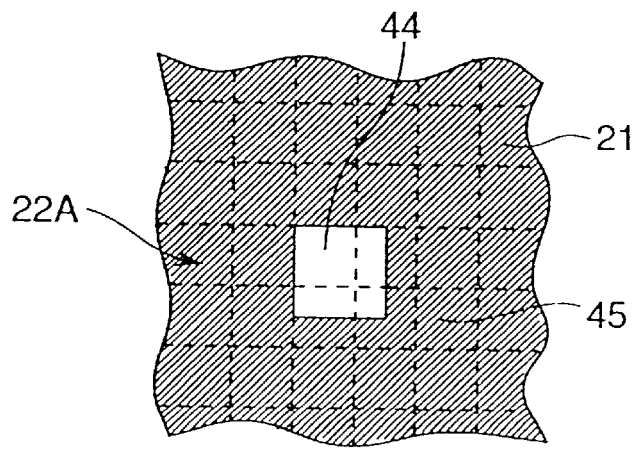
FIG. 47 shows deformation of the specific pattern of FIG. 6 in a state in which that the specific pattern is surrounded by only black cells.

However, such a correction requires to recognize the outer edge of the loop portion 45. If the loop portion (black) 45 is surrounded by white cells outside, the outer edge of the loop portion 45 is recognizable. On the other hand, if the values of the surrounding cells are all black as shown in FIG. 47, the outer edge of the loop portion 45 cannot be recognized so that the above-mentioned correction cannot be accomplished.

Thus, when contrast between the specific pattern 22 and the information-recorded cells 21 surrounding the specific pattern 22 is unclear, some measures are necessary for helping recognize the position of the specific pattern 22 with high accuracy.

Figure 48:
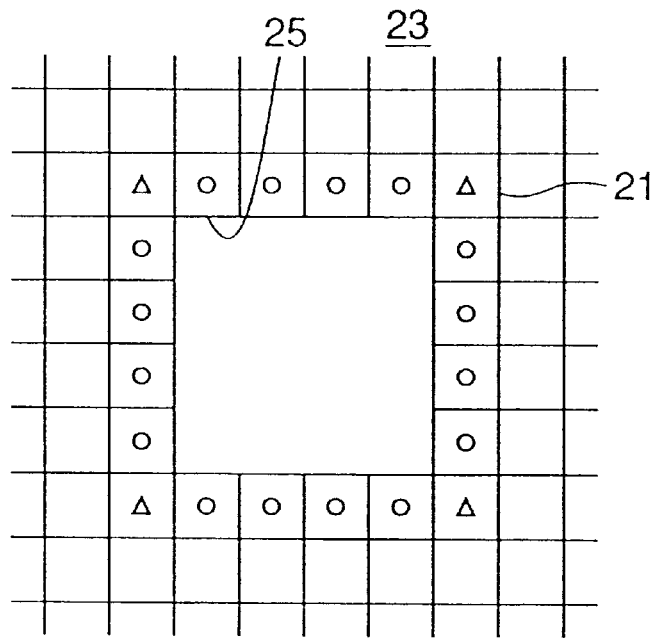
FIG. 48 is a view for explaining the condition to determine whether or not a specific pattern should be arranged with its white/black status inverted.
Figure 49:
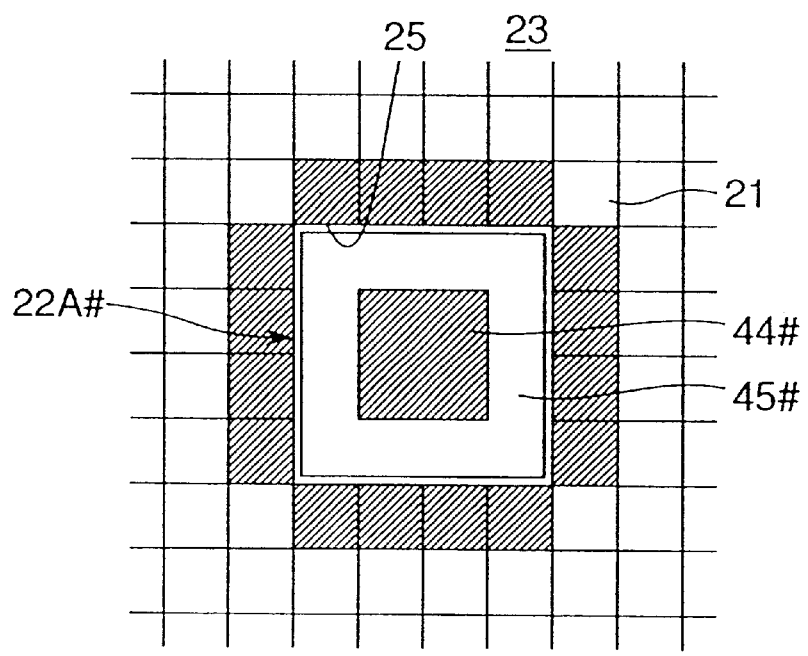
FIG. 49 is a view showing the specific pattern of FIG. 6 arranged with its white/black status inverted.
Figure 50:
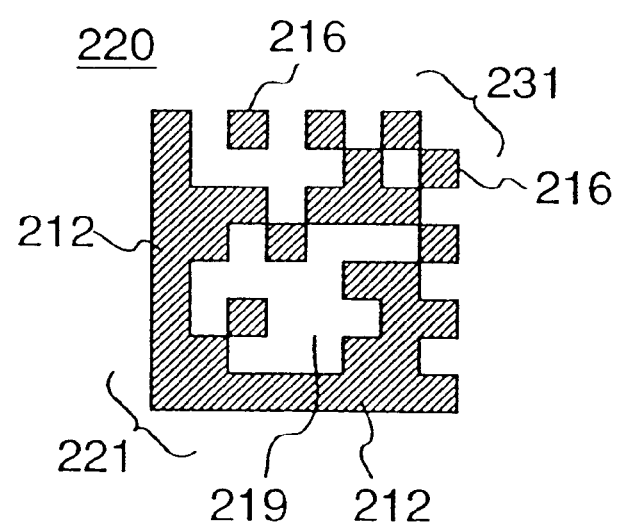
FIG. 50 is a plan view of a prior art digital information recording carrier.

As such measures, the following method is adaptable. That is, when the contrast between the specific pattern 22 and the cells surrounding it is unclear, the specific pattern 22 is placed with its values inverted in the following manner:

As shown in FIG. 48, in the information recording area 23 except a region 25 of four longitudinal cells by four transverse cells where a specific pattern (denoted by 22A below) is to be placed, values of the cells 21 are first set. Next, the values of the cells placed along the edge of the region 25 (cells marked with "O" or "Δ" in FIG. 48) are checked. Then, it is decided, for example, whether or not a condition that all of the cells marked with "O" are black is satisfied. If this condition is satisfied, a specific pattern 22A# having an inverse black/white state to that of the specific pattern 22A is placed in the region 25 as shown in FIG. 49. In FIG. 49, reference numeral 44# denotes a portion that the central closed area 44 has been inverted, and 45# denotes a portion of the loop portion 45 that has been inverted. On the other hand, if the condition that all of the cells marked with "O" in FIG. 48 are black is not satisfied, then the ordinary specific pattern 22A is placed in the region 25.

With such an arrangement, the contrast between the specific pattern 22A and the information-recorded cells 21 surrounding it becomes clear.

The information recording area 23 in which the specific patterns 22A and 22A# are placed is searched for the specific patterns 22A and 22A# in the following way. No new algorithm is required for the search for the inverted specific pattern 22A#, but the algorithm for the search for the ordinary specific pattern 22A is shared.

The search process is explained using the processing flow chart of FIG. 19.

First, a search is made on the assumption that the non-inverted, ordinary specific pattern 22A is used as the specific pattern 22. The search process is started at S41. If the ordinary specific pattern 22A has been found, the search is regarded as successful (S49) and the process is ended. If the ordinary specific pattern 22A has not been found, the search is regarded as unsuccessful (S50). In this case, the process is not ended at S50. The processing flow then returns to S42 and subsequently performs the process of searching for an inverted specific pattern 22A#. When this is done, all the steps of S42 through S49 are carried out with parameter changes of 'black' to 'white' and 'white' to 'black.' In other words, in the first process (search for an ordinary specific pattern 22A), a pattern in which a white region is surrounded by a black region is searched for, whereas a pattern in which a black region is surrounded by a white region is searched for in the second process (search for an inverted specific pattern 22A#). If an inverted specific pattern 22A# has been found, the search is regarded as successful (S50) and the process is ended. On the other hand, if neither an ordinary specific pattern 22A nor an inverted specific pattern 22A# has been found, the search is regarded as unsuccessful (S50) and the process is ended. As obvious from the above, by setting a specific pattern search algorithm using black and white as parameters, ordinary specific patterns 22A and inverted specific patterns 22A# can be searched for by the same algorithm.

As shown above, with the ordinary specific patterns 22A and the inverted specific patterns 22A# used in combination and switched as required, it is possible to detect the boundary line (edge) between black and white cells at one side, at the least, out of the top and bottom, right and left sides of the specific pattern 22A. By making use of the edge information representing this boundary line, it is possible to detect the width of at least one of the top and bottom, right and left segments of the loop portion 45 of the specific pattern 22A. In the case of a deformed specific pattern as shown in FIG. 46 in which the loop portion 45 is thicker on the right and lower sides than on the left and upper sides, positional shift of the loop portion 45 tends to be directed to the lower right, conversely to the positional shift of the central closed area 44. Thus, any errors of positional information of the specific pattern 22A are detected and corrected.

The reason that the same search algorithm is applicable to both the specific pattern 22A and the white-black inverted specific pattern 22A# only with the parameter changes of 'black' to 'white' and 'white' to 'black' is that the structural feature that the central closed area is surrounded by the loop portion holds unchanged even with inversions between black and white.

As can be understood from this, the method of making an inversion between black and white to give a contrast against the surrounding information-recorded cells is applicable also to the specific pattern 22B shown in FIG. 7. This is because the feature that the first loop portion is surrounded by the second loop portion will not change even with inversions between black and white in the specific pattern 22B.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital information decoding method for decoding information recorded on a digital information recording carrier comprising:

a planar recording surface having an information recording area, said information recording area defining a plurality of cells arranged in matrix form, each said cell being provided with an optically recognizable mark such that said cells together form an optically readable, two-dimensional pattern filling said information recording area;

said two-dimensional pattern comprising first portions wherein said cells respectively correspond to bits of digital information and second portions wherein said cells correspond to specific patterns that are spaced from each other, each said specific pattern consisting of a plurality of cells which are linked together and which are given optically recognizable marks in a respective pre-selected pattern, said specific patterns including a predetermined pattern which occupies a region in an inner portion of said information recording area spaced from the perimeter of said information recording area, said predetermined pattern including at least one central cell representing a first value and a plurality of contiguous cells representing a second value and at least partially surrounding said central cell;

said first portions of said information recording area occupy all regions of said information recording area other than the regions occupied by said specific patterns; and the cells which make up the predetermined pattern are the same size and shape as the cells which make up the first portions of said information recording area;

the digital information decoding method comprising the steps of:

searching said information recording area for said specific patterns to determine their positions;

calculating positions of arbitrary cells corresponding to bits of digital information by a proportional allocation technique, based on the positions of four specific patterns out of all of the searched specific patterns, said four specific patterns being placed on two given rows and two given columns of said matrix;

reading the bits of digital information corresponding to each cell located at a calculated position; and reproducing the digital information recorded on the recording surface based on the read bits of digital information.

2. The digital information recording method according to claim 1, wherein said cells each have a shape of the same size, wherein each specific pattern is composed of a central closed area with the shape of a square and a loop portion surrounding the central closed area entirely, wherein said central closed area consists of four cells each provided with a light as an optically recognizable mark and said loop portion consists of twelve cells each provided with a dark as an optically recognizable mark, and wherein said step of searching the information recording area for the specific patterns comprises the sub-steps of:

checking the light/dark status of a reference position of a search for the central closed area of a specific pattern, to decide whether or not the reference position is contained in the central closed area if the light/dark status of the reference position is a light; and checking a region occupied by lights which are linked to each other, said reference position being included in said region, as to whether or not the size, width, and height of the region are within certain ranges, respectively, to confirm that the region is the central closed area.

3. The digital information decoding method according to claim 1, wherein each of said cells has a shape of a square of the same size, wherein each specific pattern is composed of a central portion with a shape of a square, a first loop portion surrounding the central portion entirely, and a second loop portion surrounding the first loop portion entirely, and wherein said central portion consists of a single cell provided with a dark as an optically recognizable mark, said first loop portion consists of eight cells each provided with a light as an optically recognizable mark, and said second loop portion consists of sixteen cells each provided with a dark as a mark, and wherein said step of searching the information recording area for the specific patterns comprises the sub-steps of:

checking the light/dark status of a reference position for a search for the central closed area of a specific pattern to decide whether or not that the reference position is contained in the central closed area if the light/dark status of the reference position is a dark;

checking a first dark region occupied by darks which are linked to each other, said reference position being included in said first dark region, as to whether or not the size, width, and height of the first dark region are within certain ranges, respectively, to confirm that the first dark region is the central closed area; and confirming, when a second dark region appears within a certain distance upward, downward, rightward or leftward from the first dark region after a light region has appeared and when a loop has been made around a boundary between the light region and the second dark region, that the light region is the first loop portion.

4. A digital information decoding apparatus for decoding digital information recorded on a digital information recording carrier comprising:

a planar recording surface having an information recording area, said information recording area defining a plurality of cells arranged in matrix form, each said cell being provided with an optically recognizable mark such that said cells together form an optically readable, two-dimensional pattern filling said information recording area;

said two-dimensional pattern comprising first portions wherein said cells respectively correspond to bits of digital information and second portions wherein said cells correspond to specific patterns that are spaced from each other, each said specific pattern consisting of a plurality of cells which are linked together and which are given optically recognizable marks in a respective pre-selected pattern, said specific patterns including a predetermined pattern which occupies a region in an inner portion of said information recording area spaced from a perimeter of of said information recording area, said predetermined pattern including at least one central cell representing a first value and a plurality of contiguous cells representing a second value and at least partially surrounding said central cell;

said first portions of said information recording area occupy all regions of said information recording area other than the regions occupied by said specific patterns; and the cells which make up the predetermined pattern are the same size and shape as the cells which make up the first portions of said information recording area;

reading means for reading said two-dimensional pattern recorded on said recording surface and outputting information representing said two-dimensional pattern;

information decoding means for reproducing the digital information recorded on the recording surface, wherein said information decoding means search inside of the two-dimensional pattern represented by the output information of the reading means for the specific patterns to determine the positions thereof, then calculate positions of arbitrary cells corresponding to bits of digital information by a proportional allocation technique based on the positions of four specific patterns out of all the searched specific patterns, said four specific patterns being placed on two given rows and two given columns of said matrix, then read bits of digital information corresponding to each cell located at a calculated position, and then reproduce the digital information recorded on the recording surface based on the read bits of digital information; and output means for outputting the digital information reproduced by the information decoding means.

* * * * *